(12) United States Patent
Lithoxoos et al.

(10) Patent No.: US 11,760,632 B2
(45) Date of Patent: Sep. 19, 2023

(54) REGENERATION SCHEMES FOR A TWO-STAGE ADSORPTION PROCESS FOR CLAUS TAIL GAS TREATMENT

(71) Applicant: Saudi Arabian Oil Company, Dhahran (SA)

(72) Inventors: Georgios Lithoxoos, Dhahran (SA); Yuguo Wang, Dhahran (SA); Rashid M. Othman, Dhahran (SA); Ismail A. Alami, Dammam (SA); John P. O'Connell, Dhahran (SA); Sebastien A. Duval, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 40 days.

(21) Appl. No.: 17/788,805

(22) PCT Filed: Dec. 28, 2019

(86) PCT No.: PCT/IB2019/061417
§ 371 (c)(1),
(2) Date: Jun. 24, 2022

(87) PCT Pub. No.: WO2021/130530
PCT Pub. Date: Jul. 1, 2021

(65) Prior Publication Data
US 2023/0025621 A1   Jan. 26, 2023

(51) Int. Cl.
| | |
|---|---|
| *C01B 17/04* | (2006.01) |
| *B01D 53/26* | (2006.01) |
| *B01D 53/52* | (2006.01) |
| *B01D 53/75* | (2006.01) |
| *B01D 51/10* | (2006.01) |

(52) U.S. Cl.
CPC ............ *C01B 17/0404* (2013.01); *B01D 51/10* (2013.01); *B01D 53/261* (2013.01); *B01D 53/52* (2013.01); *B01D 53/75* (2013.01); *B01D 2253/108* (2013.01)

(58) Field of Classification Search
CPC ...... C01B 17/0404; C01B 17/16; B01D 51/10; B01D 53/261; B01D 53/52; B01D 53/75; B01D 2253/108; B01D 53/02; B01D 53/0462; B01D 53/047; B01D 53/265; B01D 2257/304; B01D 2257/80
See application file for complete search history.

(56) References Cited

U.S. PATENT DOCUMENTS

| | | | |
|---|---|---|---|
| 3,985,861 | A | 10/1976 | Hudson, Jr. |
| 5,120,517 | A | 6/1992 | Elshout |
| 6,387,159 | B1 | 5/2002 | Butwell et al. |
| 6,402,813 | B2 | 6/2002 | Monereau et al. |
| 8,361,200 | B2 | 1/2013 | Sayari et al. |
| 8,551,229 | B2 | 10/2013 | Hufton et al. |
| 9,994,452 | B2 | 6/2018 | Weiss et al. |
| 10,040,051 | B2 | 8/2018 | Weiss et al. |
| 10,112,829 | B2 | 10/2018 | Ravikumar et al. |
| 10,239,756 | B1 | 3/2019 | Wang et al. |
| 2011/0185896 | A1 | 8/2011 | Sethna et al. |
| 2015/0027056 | A1 | 1/2015 | Kortunov et al. |
| 2017/0190574 | A1 | 7/2017 | Ercan et al. |
| 2018/0065851 | A1 | 3/2018 | Rameshni et al. |
| 2022/0242729 | A1* | 8/2022 | Lithoxoos et al. ... B01D 53/002 |

FOREIGN PATENT DOCUMENTS

| | | |
|---|---|---|
| EP | 0798032 A1 | 10/1997 |
| EP | 2412667 A1 | 2/2012 |

OTHER PUBLICATIONS

International Search Report and Written Opinion for International Application No. PCT/IB2019/061417, report mail date Sep. 9, 2020; pgs. 1-12.

Liu, Xinpeng et al.; "Effective removal of hydrogen sulfide using 4A molecular sieve zeolite synthesized from attapulgite" (abstract only), Journal of Hazardous Materials, Volume 326, Mar. 15, 2017; pgs. 157-164.

Polasek, John C. et al.; "Effect of Sulfur Recovery Requirements on Optimization of Integrated Sweetening, Sulfur Recovery, and Tail-gas Cleanup Units" Proceedings of the 72 GPA Annual Convention, Tulsa, OK: Gas Processors Association, 1993; pgs. 170-174.

Keller, Al; "The Aftermath of SO2 Breakthrough and Ways to Prevent and Mitigate It" Presented at the Brimstone Sulfur Symposium, Vail, CO; Sep. 10-14, 2012; pgs. 1-22.

* cited by examiner

*Primary Examiner* — Timothy C Vanoy
(74) *Attorney, Agent, or Firm* — Bracewell LLP; Constance G. Rhebergen; Eleanor L. Tyson

(57) ABSTRACT

Embodiments of the disclosure provide a method and system for sulfur recovery. A Claus tail gas stream is fed to a hydrogenation reactor to produce a hydrogenated gas stream. The hydrogenated gas stream is fed to a quench tower to produce a quenched gas stream. The quenched gas stream is fed to a first stage adsorption vessel of first stage adsorption unit to produce a first outlet gas stream. The first outlet gas stream is fed to a second stage adsorption vessel of a second stage adsorption unit to produce a second byproduct gas stream. The first stage adsorption vessel is regenerated to produce a first byproduct gas stream. The second stage adsorption vessel is regenerated to produce a second outlet gas stream including hydrogen sulfide. Optionally, a portion of the second byproduct gas stream or nitrogen can be fed to the first stage adsorption vessel or the second stage adsorption vessel for regeneration. Optionally, a sales gas can be fed to the second stage adsorption vessel for regeneration. Optionally, vacuum can be applied to the first stage adsorption vessel or the second stage adsorption vessel for regeneration.

31 Claims, 11 Drawing Sheets

REGENERATION SCHEMES FOR A TWO-STAGE ADSORPTION PROCESS FOR CLAUS TAIL GAS TREATMENT

CROSS-REFERENCE TO RELATED APPLICATIONS

This application claims the benefit and priority of PCT/IB2019/061417 filed on Dec. 28, 2019 and titled "Regeneration Schemes for a Two-Stage Adsorption Process for Claus Tail Gas Treatment". For purposes of United States patent practice, this application incorporates the contents of the International Application by references in its entirety.

BACKGROUND

Field of the Disclosure

Embodiments of the disclosure generally relate to sulfur recovery. More specifically, embodiments of the disclosure relate to system and method for regenerating adsorption vessels used for hydrogen sulfide recovery from a Claus tail gas.

Description of the Related Art

Sulfur recovery typically refers to the conversion of hydrogen sulfide to elemental sulfur. Hydrogen sulfide is a byproduct of processing natural gas and refining sulfur-containing crude oils. The conventional method of sulfur recovery is the Claus process. Approximately 90 percent (%) to 95% of recovered sulfur is produced by the Claus process. A conventional Claus process can recover between 95% and 98% of the hydrogen sulfide.

The conventional Claus process includes a thermal combustion stage and a catalytic reaction stage. In terms of equipment, the Claus unit (or Claus plant) includes a thermal reactor and two or three catalytic reactors (or Claus converters). Typical sulfur recovery efficiency for Claus units with two Claus converters is between 90% and 97%, and for a Claus unit with three Claus converters is between 95% and 98%. But there is increasing demand to achieve higher sulfur removal and recovery efficiency due to tight emissions regulations. Recent environmental regulations regarding sulfur oxides ($SO_x$) emissions place a stringent requirement on commercial sulfur recovery and accordingly, most countries require sulfur recovery efficiency in the range of 98.5% to 99.9%, or higher.

The addition of a tail gas treatment unit (TGTU) can increase sulfur recovery to or above 99.9%, but requires complex and expensive equipment. The TGTU entails either an add-on unit at the end of the Claus unit or a modification to the Claus unit itself. The add-on TGTU at the end of the Claus unit is generally used when the Claus process includes two Claus converters. Although there are several varieties of tail gas treatment technologies, they can be grouped into the following four broad categories: sub-dew point Claus process, direct oxidation of hydrogen sulfide to sulfur, sulfur dioxide reduction and recovery of hydrogen sulfide, and hydrogen sulfide combustion to sulfur dioxide and recovery of sulfur dioxide.

Sub-dew point Claus processes are processes based on a Claus converter performing at temperatures lesser than the sulfur dew point (lesser temperature is desirable due to equilibrium nature of the Claus catalytic reaction). Sub-dew point processes provide high equilibrium conversions in one catalyst bed, but are complicated by the need for periodic catalyst regeneration by sulfur evaporation at elevated temperatures. To accommodate for regeneration, such processes are usually performed in two or three (or even more) parallel reactors, periodically undergoing reaction and regeneration. Cold-bed-adsorption (CBA) is the most efficient sub-dew point process and can achieve 99% sulfur recovery.

Processes involving direct oxidation of hydrogen sulfide to sulfur are based on selective oxidation of hydrogen sulfide by oxygen to elemental sulfur using selective catalysts.

TGTU technology based on sulfur dioxide reduction and recovery of hydrogen sulfide involves the catalytic hydrogenation of leftover sulfur species to hydrogen sulfide, absorption of the hydrogen sulfide with amine solution and then recycling the hydrogen sulfide back to the Claus furnace.

TGTU technology based on hydrogen sulfide combustion to sulfur dioxide and recovery of sulfur dioxide involves the combustion of leftover hydrogen sulfide in the tail gas stream to sulfur dioxide, absorption of sulfur dioxide with a solvent (wet scrubbing), and recycling the sulfur dioxide back to the feed to Claus unit. Although sulfur dioxide scrubbing, also known as flue gas scrubbing, has not been commercially tested as a TGTU, the technology has been extensively used as flue gas scrubbing for coal based power stations.

SUMMARY

Embodiments of the disclosure generally relate to sulfur recovery. More specifically, embodiments of the disclosure relate to system and method for regenerating adsorption vessels used for hydrogen sulfide recovery from a Claus tail gas.

Embodiments of the disclosure provide a method for sulfur recovery. The method includes the step of feeding a tail gas stream to a hydrogenation reactor to produce a hydrogenated gas stream by converting sulfur-containing compounds to hydrogen sulfide. The hydrogenated gas stream includes hydrogen sulfide, water, and at least one of carbon dioxide and nitrogen. The hydrogenated gas stream is in the absence of the sulfur-containing compounds other than hydrogen sulfide. The method includes the step of feeding the hydrogenated gas stream to a quench tower to produce a quenched gas stream by condensing and recovering liquid water via a first water condensate stream. The quenched gas stream includes hydrogen sulfide and at least one of water, carbon dioxide, and nitrogen. The method includes the step of feeding the quenched gas stream to a first stage adsorption vessel of a first stage adsorption unit to produce a first outlet gas stream by adsorbing water. The first outlet gas stream includes hydrogen sulfide and at least one of carbon dioxide and nitrogen. The first outlet gas stream is in the absence of water. The method includes the step of feeding the first outlet gas stream to a second stage adsorption vessel of a second stage adsorption unit to produce a second byproduct gas stream by adsorbing hydrogen sulfide. The second byproduct gas stream is in the absence of hydrogen sulfide. The method includes the step of regenerating the first stage adsorption vessel to produce a first byproduct gas stream by desorbing water. The first byproduct gas stream includes water. The method includes the step of regenerating the second stage adsorption vessel to produce a second outlet gas stream. The second outlet gas stream includes hydrogen sulfide.

In some embodiments, the method further includes the step of cooling the hydrogenated gas stream to a temperature ranging between 40° C. and 80° C. In some embodiments, the method further includes the step of pressurizing the quenched gas stream to a pressure ranging between 2 bar and 4 bar. The method further includes the step of cooling the quenched gas stream to a temperature ranging between 10° C. and 30° C. In some embodiments, the method further includes the step of feeding the quenched gas stream to a collection drum to produce an adsorption feed stream by recovering liquid water via a second water condensate stream. The adsorption feed stream is fed to the first stage adsorption vessel.

In some embodiments, the first stage adsorption unit includes at least three first stage adsorption vessels fluidly connected in parallel such that continuous flows of the first outlet gas stream and the first byproduct gas stream are provided by having one of the at least three first stage adsorption vessels in an adsorption cycle, one of the at least three first stage adsorption vessels in a regeneration cycle, and one of the at least three first stage adsorption vessels in a standby cycle. In some embodiments, the first stage adsorption vessel includes a first adsorbent. The first adsorbent adsorbs water while passes hydrogen sulfide, carbon dioxide, and nitrogen to form the first outlet gas stream during an adsorption cycle. In some embodiments, the first adsorbent includes a hydrophilic 3 Å molecular sieve.

In some embodiments, the second stage adsorption unit includes at least three second stage adsorption vessels fluidly connected in parallel such that continuous flows of the second outlet gas stream and the second byproduct gas stream are provided by having one of the at least three second stage adsorption vessels in an adsorption cycle, one of the at least three second stage adsorption vessels in a regeneration cycle, and one of the at least three second stage adsorption vessels in a standby cycle. In some embodiments, the second stage second stage adsorption vessel includes a second adsorbent. The second adsorbent adsorbs hydrogen sulfide while passes carbon dioxide and nitrogen to form the second byproduct stream during an adsorption cycle. In some embodiments, the second adsorbent includes a Cu-Y type zeolite.

In some embodiments, the regenerating the first stage adsorption vessel step includes feeding a portion of the second byproduct gas stream to the first stage adsorption vessel. In some embodiments, the regenerating the first stage adsorption vessel step includes feeding nitrogen gas to the first stage adsorption vessel. In some embodiments, the regenerating the first stage adsorption vessel step includes applying vacuum to the first stage adsorption vessel.

In some embodiments, the regenerating the second stage adsorption vessel step includes feeding a portion of the second byproduct gas stream to the second stage adsorption vessel. In some embodiments, the regenerating the second stage adsorption vessel step includes feeding a sales gas to the second stage adsorption vessel. In some embodiments, the regenerating the second stage adsorption vessel step includes feeding nitrogen gas to the second stage adsorption vessel. In some embodiments, the regenerating the second stage adsorption vessel step includes applying vacuum to the second stage adsorption vessel.

Embodiments of the disclosure also provide a Claus tail gas treatment system for sulfur recovery. The Claus tail gas treatment system includes a hydrogenation reactor, a quench tower, a first stage adsorption unit, and a second stage adsorption unit. The hydrogenation reactor is configured to receive a Claus tail gas and to convert sulfur-containing compounds to hydrogen sulfide such that a hydrogenated gas stream is produced. The Claus tail gas includes the sulfur-containing compounds. The hydrogenated gas stream includes hydrogen sulfide, water, and at least one of carbon dioxide and nitrogen. The hydrogenated gas stream is in the absence of the sulfur-containing compounds other than hydrogen sulfide. The quench tower is fluidly connected downstream of the hydrogenation reactor to receive the hydrogenated gas stream. The quench tower is configured to condense and recover liquid water via a first water condensate stream and to produce a quenched gas stream. The quenched gas stream includes hydrogen sulfide and at least one of water, carbon dioxide, and nitrogen. The first stage adsorption unit includes at least three first stage adsorption vessels fluidly connected in parallel. During a first stage adsorption cycle, one of the at least three first stage adsorption vessels is fluidly connected downstream of the quench tower to receive the quenched gas stream and adsorb water to produce a first outlet gas stream. During a first stage regeneration cycle, one of the at least three first stage adsorption vessels desorbs water to produce a first byproduct gas stream. The first outlet gas stream includes hydrogen sulfide and at least one of: carbon dioxide and nitrogen. The first outlet gas stream is in the absence of water. The first byproduct stream includes water. The second stage adsorption unit includes at least three second stage adsorption vessels fluidly connected in parallel. During a second stage adsorption cycle, one of the at least three second stage adsorption vessels is fluidly connected downstream of first stage adsorption unit to receive the first outlet gas stream and adsorb hydrogen sulfide to produce a second byproduct gas stream. During a second stage regeneration cycle, one of the at least three second stage adsorption vessels desorbs hydrogen sulfide to produce a second outlet gas stream. The second byproduct gas stream is in the absence of hydrogen sulfide. The second outlet gas stream includes hydrogen sulfide.

In some embodiments, the Claus tail gas treatment system further includes a first heat exchanger. The first heat exchanger is fluidly connected downstream of the hydrogenation reactor and upstream of the quench tower. The first heat exchanger is configured to cool the hydrogenated gas stream to a temperature ranging between 40° C. and 80° C.

In some embodiments, the Claus tail gas treatment system further includes a compressor, a second heat exchanger, and a collection drum. The compressor is fluidly connected downstream of the quench tower. The compressor is configured to pressurize the quenched gas stream to a pressure ranging between 2 bar and 4 bar. The second heat exchanger is fluidly connected downstream of the quench tower. The second heat exchanger configured to cool the quenched gas stream to a temperature ranging between 10° C. and 30° C. The collection drum fluidly connected downstream of the compressor and the second heat exchanger and upstream of the first stage adsorption unit. The collection drum is configured to produce an adsorption feed stream by recovering liquid water from the quenched gas stream via a second water condensate stream. The adsorption feed stream is introduced to the first stage adsorption unit.

In some embodiments, the first stage adsorption vessel includes a first adsorbent. The first adsorbent is configured to adsorb water while passing hydrogen sulfide, carbon dioxide, and nitrogen to form the first outlet gas stream during the first stage adsorption cycle. In some embodiments, the first adsorbent includes a hydrophilic 3 Å molecular sieve.

In some embodiments, the second stage adsorption vessel includes a second adsorbent. The second adsorbent is configured to adsorb hydrogen sulfide while passing carbon dioxide and nitrogen to form the second byproduct stream during the second stage adsorption cycle. In some embodiments, the second adsorbent includes a Cu-Y type zeolite.

In some embodiments, the first byproduct gas stream is introduced to the quench tower. In some embodiments, a portion of the second byproduct gas stream is introduced to one of the at least three first stage adsorption vessels during the first stage regeneration cycle. In some embodiments, a portion of the second byproduct gas stream is introduced to one of the at least three second stage adsorption vessels during the second stage regeneration cycle. In some embodiments, a sales gas is introduced to one of the at least three second stage adsorption vessels during the second stage regeneration cycle. In some embodiments, nitrogen gas is introduced to one of the at least three first stage adsorption vessels during the first stage regeneration cycle and to one of the at least three second stage adsorption vessels during the second stage regeneration cycle. In some embodiments, vacuum is applied to one of the at least three first stage adsorption vessels during the first stage regeneration cycle and to one of the at least three second stage adsorption vessels during the second stage regeneration cycle.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1:
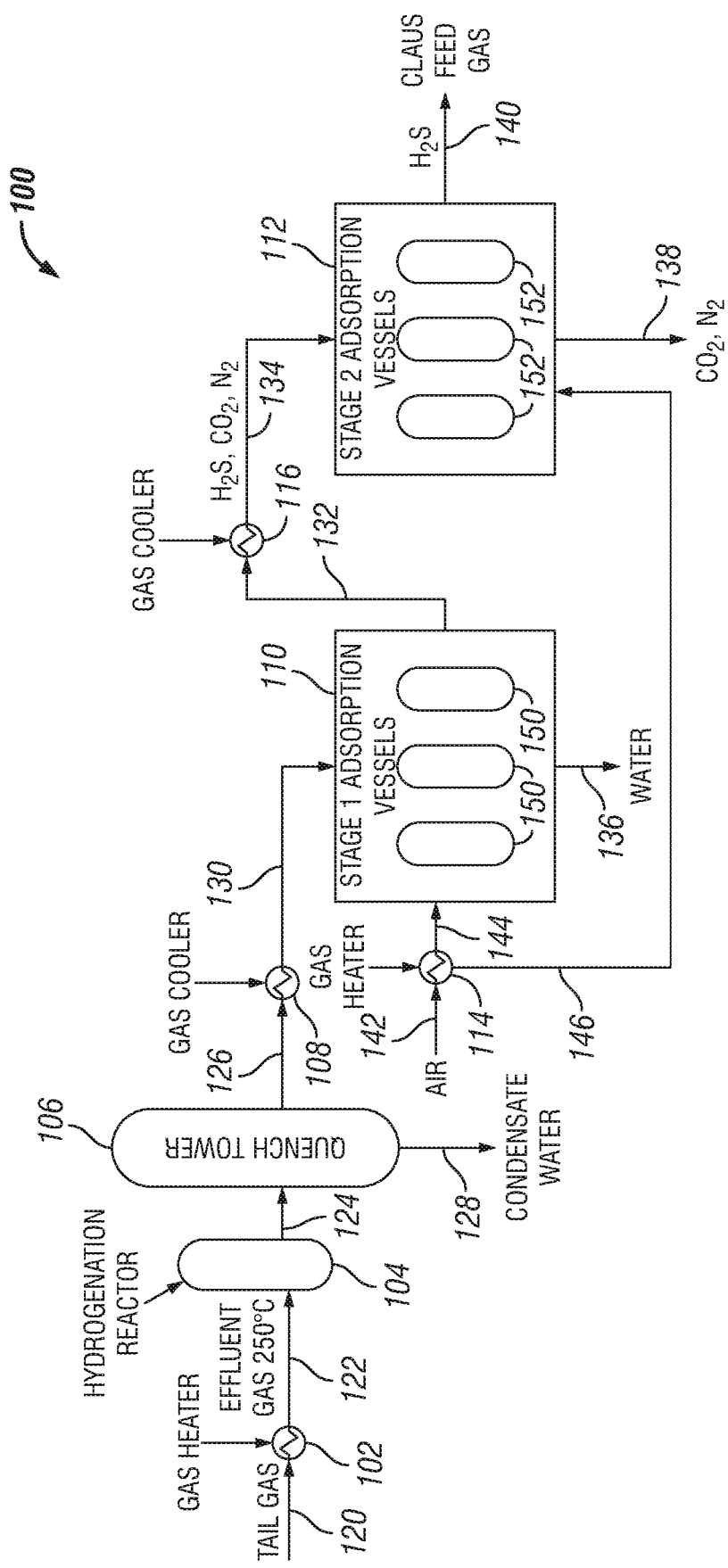
FIG. 1 is a schematic diagram of a process for Claus tail gas treatment according to an embodiment of the disclosure.

In the accompanying Figures, similar components or features, or both, may have a similar reference label.

DETAILED DESCRIPTION

The disclosure refers to particular features, including process or method steps and systems. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/- 5% of the cited magnitude. The word "substantially" includes +/- 5% of the cited magnitude. The word "significant portion" refers to a portion that is more than 50% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first"

and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words are for descriptive convenience and are not limiting unless otherwise indicated.

As used throughout the disclosure, the term "elemental sulfur" refers to all phases of sulfur, which can exist in the forms such as S, $S_2$, $S_3$, $S_4$, $S_5$, $S_6$, $S_7$, and $S_8$.

As used throughout the disclosure, the term "sour water stripper" refers to a device or apparatus that removes hydrogen sulfide from sour water, that is, hydrogen sulfide-containing water. For example, liquid water separated by a collection drum can include hydrogen sulfide. The liquid water can be introduced to a sour water stripper, where steam is injected into the sour water stripper to shift the chemical equilibria by heating the sour water such that hydrogen sulfide is released.

As used throughout the disclosure, the term "thermal oxidizer" refers to a device or apparatus that thermally decomposes certain gases at a predetermined temperature and releases them into the atmosphere. For example, a gas stream can be introduced to a thermal oxidizer, where any trace quantities of hydrogen sulfide included in the gas stream can be oxidized to sulfur dioxide and subsequently released to the atmosphere.

As used throughout the disclosure, the term "reaction furnace" refers to a device or apparatus that is typically included in an upstream portion of a Claus unit, which initiates the conversion of hydrogen sulfide and other sulfur-containing compounds to elemental sulfur. The reaction furnace typically operates at a temperature greater than 850° C. such that hydrogen sulfide is converted to elemental sulfur.

Embodiments of the disclosure provide regeneration schemes of adsorption vessels in a a Claus tail gas treatment system that can increase overall sulfur recovery (in combination with the Claus unit) to at least about 99.90%, alternately to at least about 99.93%, and alternately to at least about 99.95%. In some embodiments, the Claus tail gas treatment system is an add-on unit positioned at the end of the Claus unit configured to receive the tail gas from the Claus unit. In other embodiments, the Claus tail gas treatment system is an independent unit configured to receive the tail gas from the Claus unit. Still in other embodiments, the Claus tail gas treatment system can be positioned between two Claus converters within the Claus unit.

FIG. 1 shows a schematic diagram of process 100 for an embodiment of the Claus tail gas treatment system. Process 100 can include first heat exchanger 102, hydrogenation reactor 104, quench tower 106, second heat exchanger 108, first stage adsorption unit 110, second stage adsorption unit 112, third heat exchanger 114, and fourth heat exchanger 116.

Tail gas stream 120 is heated via first heat exchanger 102 to produce a tail gas stream 120. Tail gas stream 122 is introduced to hydrogenation reactor 104 to produce hydrogenated gas stream 124. Hydrogenated gas stream 124 is introduced to quench tower 106 to produce quenched gas stream 126 and water condensate stream 128. Quenched gas stream 126 is cooled via the second heat exchanger 108 to produce quenched gas stream 130. Quenched gas stream 130 is introduced to first stage adsorption unit 110 to produce first outlet gas stream 132 and first byproduct stream 136. First outlet gas stream 132 is cooled via fourth heat exchanger 116 to produce first outlet gas stream 134. First outlet gas stream 134 is introduced to second stage adsorption unit 112 to produce second outlet gas stream 140 and second byproduct stream 138.

Optionally, air feed 142 can be heated via third heat exchanger 114 to produce first regeneration gas stream 144 and second regeneration gas stream 146. First regeneration gas stream 144 is introduced to first stage adsorption unit 110. Second regeneration gas stream 146 is introduced to second stage adsorption unit 112.

Tail gas stream 120 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include SO, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

First heat exchanger 102 can be any heat exchanger capable of heating a gas stream to a temperature at which hydrogenation reactions can occur in hydrogenation reactor 104. First heat exchanger 102 can heat tail gas stream 120 such that tail gas stream 122 has a temperature between about 200° C. and about 300° C., alternately between about 220° C. and about 280° C., and alternately between about 240° C. and about 260° C. In at least one embodiment, the temperature of tail gas stream 122 is about 250° C. Tail gas stream 122 can include the sulfur-containing compounds, carbon dioxide, water, nitrogen, hydrogen, and combinations of the same.

Hydrogenation reactor 102 can be any reactor, catalytic or non-catalytic, capable of reducing the sulfur-containing compounds other than hydrogen sulfide to hydrogen sulfide. Optionally, hydrogen included in tail gas stream 122 can be used for reducing the sulfur-containing compounds to hydrogen sulfide. Optionally, a make-up hydrogen gas stream (not shown) can be introduced to hydrogenation reactor 102. Optionally, water can be produced as a byproduct during the hydrogenation reaction. As a result, hydrogenated gas stream 124 includes sulfur-containing compounds of substantially hydrogen sulfide only. Hydrogenated gas stream 124 can also include carbon dioxide, water, nitrogen, and combinations of the same.

Quench tower 106 can be any apparatus capable of condensing and recovering water. A significant portion of water included in hydrogenated gas stream 124 is condensed and substantially recovered via water condensate stream 128. Although a significant portion of water included in hydrogenated gas stream 124 is removed, the resulting quenched gas stream 126 can still include residual amounts of gas phase water. Quenched gas stream 126 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 126 is about 8 mol %. Quenched gas stream 126 can also include hydrogen sulfide (that is, the hydrogen sulfide preexisting in the Claus tail gas or produced in hydrogenation reactor 102, or both), carbon dioxide, nitrogen, and combinations of the same. Quenched gas stream 126 has a temperature ranging between about 20° C. and about 170° C., alternately between about 30° C. and about 100° C., or alternately between about 40° C. and about 80° C. In at least one embodiment, the temperature of quenched gas stream 126 is about 43° C.

Second heat exchanger 108 can be any heat exchanger capable of cooling a gas stream to a temperature at which adsorption occurs in first stage adsorption unit 110. Second heat exchanger 108 can cool quenched gas stream 126 such that quenched gas stream 130 has a temperature ranging between about 0° C. and about 70° C., alternately between about 10° C. and about 40° C., and alternately between about 15° C. and about 30° C. In at least one embodiment, the temperature of quenched gas stream 130 is about 21° C. As quenched gas stream 126 is cooled, the gas phase water content of quenched gas stream 130 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 130 is about 0.46 mol %. Quenched gas stream 130 can include hydrogen sulfide (that is, the hydrogen sulfide preexisting in the Claus tail gas or produced in hydrogenation reactor 102, or both), carbon dioxide, water, nitrogen, and combinations of the same.

First stage adsorption unit 110 includes one or more first stage adsorption vessels 150 fluidly connected in a serial or parallel manner. Each of the one or more first stage adsorption vessels 150 is filled with a first adsorbent. The first adsorbent can include any adsorbent capable of selectively capturing hydrogen sulfide, carbon dioxide, and nitrogen while rejecting water from a wet gas stream (such as the first cool gas stream 130). Non-limiting example materials used for the first adsorbent include all-silica zeolites having a framework such as an MFI type or a CHA type. The all-silica zeolites are hydrophobic materials that can be used to separate polar molecules such as water from lesser polar molecules such as hydrogen sulfide, carbon dioxide, and nitrogen. During an adsorption cycle, components of quenched gas stream 130 are introduced through one or more first stage adsorption vessels 150 of first stage adsorption unit 110. Components other than water (that is, hydrogen sulfide, carbon dioxide, and nitrogen) are captured in the pores of the first adsorbent. Water passes through the first adsorbent and is subsequently collected via first byproduct stream 136. During a regeneration cycle, components of first regeneration gas stream 144 enter one or more first stage adsorption vessels 150 to regenerate the first adsorbent. Desorption occurs in the one or more first stage adsorption vessels 150, where the first adsorbent releases the captured hydrogen sulfide, carbon dioxide, and nitrogen to produce first outlet gas stream 132 substantially in the absence of water.

In an alternate embodiment, the first adsorbent can include any adsorbent capable of selectively capturing water form a wet gas stream (such as quenched gas stream 130) while rejecting hydrogen sulfide, carbon dioxide, and nitrogen. Non-limiting example materials used for the first adsorbent include hydrophilic 3 Å molecular sieves as shown for example in U.S. Pat. Pub. No. 2017/0190574, which is incorporated in this disclosure by reference in its entirety. During an adsorption cycle, components of quenched gas stream 130 are introduced through one or more first stage adsorption vessels 150 of first stage adsorption unit 110. Water is captured in the pores of the first adsorbent. Components other than water (that is, hydrogen sulfide, carbon dioxide, and nitrogen) pass through the first adsorbent to produce first outlet gas stream 132 substantially in the absence of water. During a regeneration cycle, components of first regeneration gas stream 144 enter one or more first stage adsorption vessels 150 to regenerate the first adsorbent. Desorption occurs in one or more first stage adsorption vessels 150, where the first adsorbent releases the captured water which can be collected via first byproduct stream 136.

In some embodiments, first stage adsorption unit 110 includes at least three first stage adsorption vessels 150 fluidly connected in a parallel manner. At any given moment during operation, one of the at least three first stage adsorption vessels 150 is conducting the adsorption cycle, one of the at least three first stage adsorption vessels 150 is conducting the regeneration cycle, and one of the at least three first stage adsorption vessels 150 is standing by. In this manner, components of quenched gas stream 130 can be continuously fed to first stage adsorption unit 110 and a continuous flow of first outlet gas stream 132 can be produced from first stage adsorption unit 110.

Fourth heat exchanger 116 can be any heat exchanger capable of cooling a gas stream to a temperature at which adsorption occurs in second stage adsorption unit 112. Fourth heat exchanger 116 can cool first outlet gas stream 132 such that first outlet gas stream 134 has a temperature between about 0° C. and about 70° C., alternately between about 10° C. and about 40° C., and alternately between about 15° C. and about 30° C. In at least one embodiment, the temperature of first outlet gas stream 134 is about 25° C. First outlet gas stream 134 can include hydrogen sulfide, carbon dioxide, nitrogen, and combinations of the same, all of which are products of first stage adsorption unit 110.

Second stage adsorption unit 112 includes one or more second stage adsorption vessels 152 fluidly connected in a serial or parallel manner. Each of the one or more second stage adsorption vessels 152 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. During an adsorption cycle, components of first outlet gas stream 134 are introduced through one or more second stage adsorption vessels 152 of second stage adsorption unit 112. Hydrogen sulfide is captured in the pores of the second adsorbent. Components other than hydrogen sulfide (that is, carbon dioxide and nitrogen) pass through the second adsorbent and are subsequently collected via second byproduct stream 138. During a regeneration cycle, components of second regeneration gas stream 146 enter one or more second stage adsorption vessels 152 to regenerate the second adsorbent. Desorption occurs in one or more second stage adsorption vessels 152, where the second adsorbent releases the captured hydrogen sulfide to produce second outlet gas stream 140 substantially in the absence of carbon dioxide and nitrogen.

In some embodiments, second stage adsorption unit 112 includes at least three second stage adsorption vessels 152 fluidly connected in a parallel manner. At any given moment during operation, one of the at least three second stage adsorption vessels 152 is conducting the adsorption cycle, one of the at least three second stage adsorption vessels 152 is conducting the regeneration cycle, and one of the at least three second stage adsorption vessels 152 is standing by. In this manner, components of first outlet gas stream 134 can be continuously fed to second stage adsorption unit 112 and a continuous flow of second outlet gas stream 140 can be produced from second stage adsorption unit 112.

Air feed 142 can be any oxygen-containing gas suitable for regenerating adsorbent materials. Non-limiting example gases suitable for use as air feed 142 include air, oxygen-enriched air, pure oxygen, and combinations of the same. In at least one embodiment, air feed 142 is air.

Third heat exchanger 114 can be any heat exchanger capable of heating a gas stream to a temperature at which adsorbent regeneration occurs in each of first stage adsorption unit 110 and second stage adsorption unit 112. Third heat exchanger 114 can heat air feed 142 such that each of first regeneration gas stream 144 and second regeneration gas stream 146 has a temperature between about 150° C. and about 350° C., alternately between about 200° C. and about 300° C., and alternately between about 230° C. and about 290° C. In at least one embodiment, the temperature of each of first regeneration gas stream 144 and second regeneration gas stream 146 is about 260° C.

Second outlet gas stream 140 includes hydrogen sulfide. Second outlet gas stream 140 has a hydrogen sulfide content of at least about 95 wt. %, alternately at least about 98 wt. %, and alternately at least about 99 wt. %. In some embodiments, second outlet gas stream 140 can be used as a feed gas for the Claus unit.

Figure 2A:
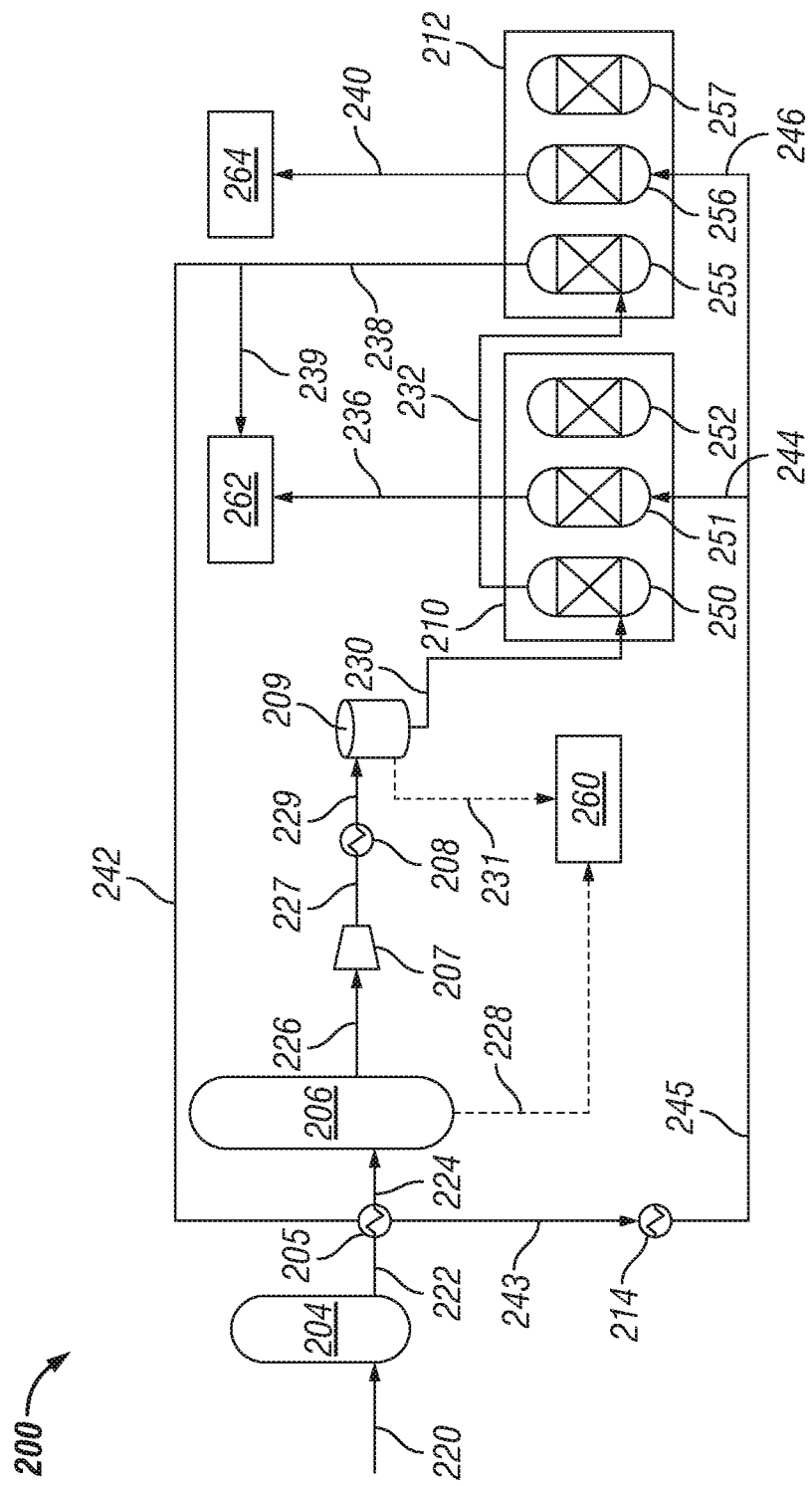
FIGS. 2A and B are schematic diagrams of a process for Claus tail gas treatment according to an embodiment of the disclosure.

FIGS. 2A and B show schematic diagrams of process 200 for an embodiment of the Claus tail gas treatment system. Process 200 can include hydrogenation reactor 204, first heat exchanger 205, quench tower 206, compressor 207, second heat exchanger 208, collection drum 209, first stage adsorption unit 210, second stage adsorption unit 212, and third heat exchanger 214.

In one embodiment, as shown in FIG. 2A, tail gas stream 220 is introduced to hydrogenation reactor 204 to produce hydrogenated gas stream 222. Hydrogenated gas stream 222 is cooled via first heat exchanger 205 to produce hydrogenated gas stream 224. Hydrogenated gas stream 224 is introduced to quench tower 206 to produce quenched gas stream 226 and first water condensate stream 228. Quenched gas stream 226 is pressurized by compressor 207 to produce quenched gas stream 227. Quenched gas stream 227 is cooled by second heat exchanger 208 to produce quenched gas stream 229. Quenched gas stream 229 is introduced to collection drum 209 to produce second water condensate stream 231 and adsorption feed stream 230. First water condensate stream 228 and second water condensate stream 231 can be introduced to sour water stripper 260 for further processing. Adsorption feed stream 230 is introduced to first stage adsorption vessel 250 of first stage adsorption unit 210 to produce first outlet gas stream 232. First outlet gas stream 232 is introduced to second stage adsorption vessel 255 of second stage adsorption unit 212 to produce second byproduct stream 238. Second byproduct stream 238 can be separated into second byproduct stream 239 and second byproduct stream 242. Second byproduct stream 242 is heated via first heat exchanger 205 to produce second byproduct stream 243 by exchanging heat from hydrogenated gas stream 222. Optionally, second byproduct stream 243 can be further heated via third heat exchanger 214 to produce second byproduct stream 245. Second byproduct stream 245 is separated into first regeneration gas stream 244 and second regeneration gas stream 246. First regeneration gas stream 244 is introduced to first stage adsorption vessel 251 of first stage adsorption unit 210 to produce first byproduct stream 236. Second byproduct stream 239 and first byproduct stream 236 can be introduced to thermal oxidizer 262 for further processing. Second regeneration gas stream 246 is introduced to second stage adsorption vessel 256 of second stage adsorption unit 212 to produce second outlet gas stream 240. Second outlet gas stream 240 can be introduced to reaction furnace 264 of a Claus unit for further processing.

Figure 2B:
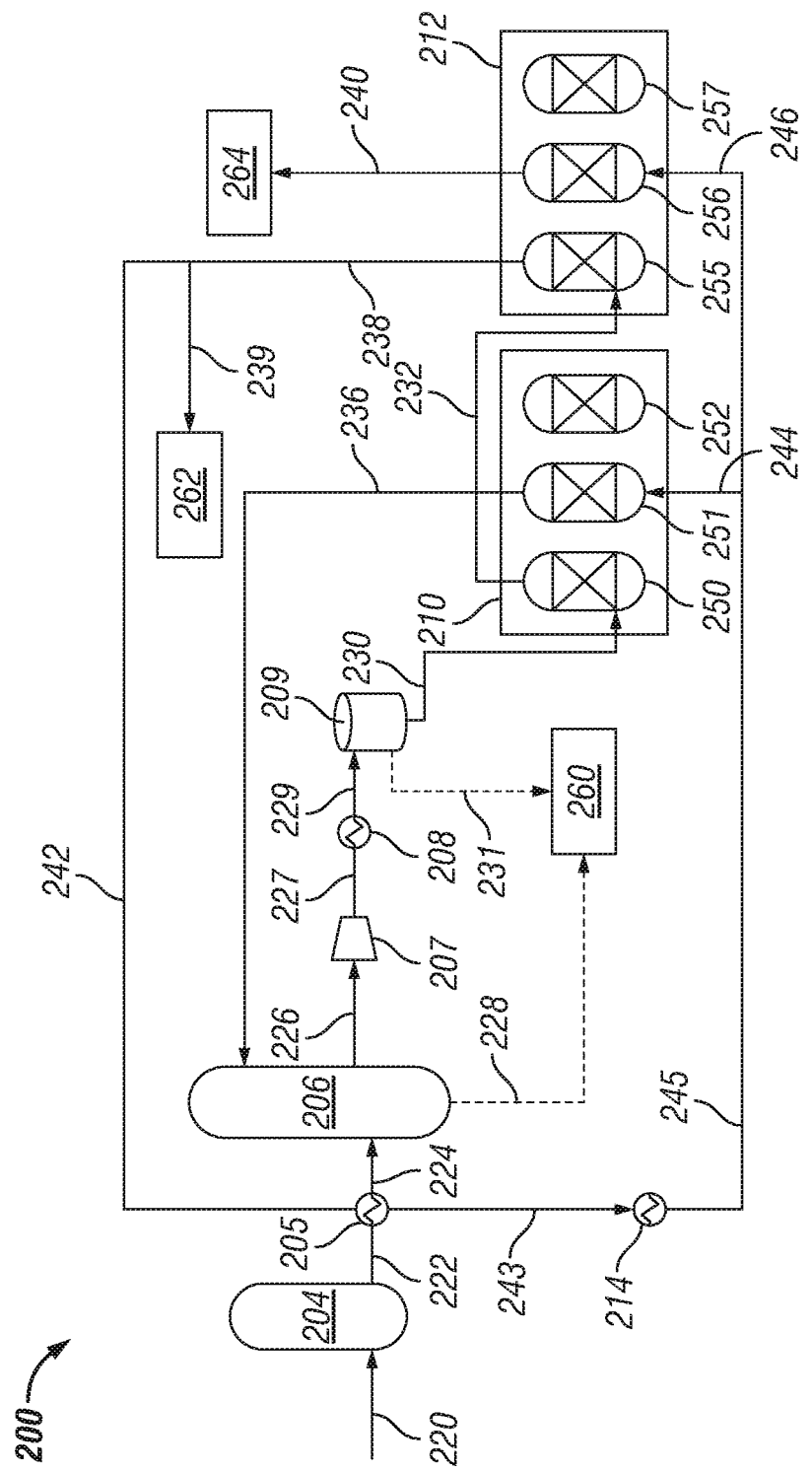

In an alternate embodiment, as shown in FIG. 2B, tail gas stream 220 is introduced to hydrogenation reactor 204 to produce hydrogenated gas stream 222. Hydrogenated gas stream 222 is cooled via first heat exchanger 205 to produce hydrogenated gas stream 224. Hydrogenated gas stream 224 is introduced to quench tower 206 to produce quenched gas stream 226 and first water condensate stream 228. Quenched gas stream 226 is pressurized by compressor 207 to produce quenched gas stream 227. Quenched gas stream 227 is cooled by second heat exchanger 208 to produce quenched gas stream 229. Quenched gas stream 229 is introduced to collection drum 209 to produce second water condensate stream 231 and adsorption feed stream 230. First water condensate stream 228 and second water condensate stream 231 can be introduced to sour water stripper 260 for further processing. Adsorption feed stream 230 is introduced to first stage adsorption vessel 250 of first stage adsorption unit 210 to produce first outlet gas stream 232. First outlet gas stream 232 is introduced to second stage adsorption vessel 255 of second stage adsorption unit 212 to produce second byproduct stream 238. Second byproduct stream 238 can be separated into second byproduct stream 239 and second byproduct stream 242. Second byproduct stream 239 can be introduced to thermal oxidizer 262 for further processing. Second byproduct stream 242 is heated via first heat exchanger 205 to produce second byproduct stream 243 by exchanging heat from hydrogenated gas stream 222. Optionally, second byproduct stream 243 can be further heated via third heat exchanger 214 to produce second byproduct stream 245. Second byproduct stream 245 is separated into first regeneration gas stream 244 and second regeneration gas stream 246. First regeneration gas stream 244 is introduced to first stage adsorption vessel 251 of first stage adsorption unit 210 to produce first byproduct stream 236. First byproduct stream 236 is introduced to quench tower 206. Second regeneration gas stream 246 is introduced to second stage adsorption vessel 256 of second stage adsorption unit 212 to produce second outlet gas stream 240. Second outlet gas stream 240 can be introduced to reaction furnace 264 of a Claus unit for further processing.

Tail gas stream 220 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

Optionally, tail gas stream 220 can be preheated to a temperature at which hydrogenation reactions can occur in hydrogenation reactor 204. Tail gas stream 220 can be preheated to a temperature between about 200° C. and about 300° C., alternately between about 220° C. and about 280° C., and alternately between about 240° C. and about 260° C. In at least one embodiment, tail gas stream 220 can be preheated to a temperature of about 250° C.

Hydrogenation reactor 204 can be any reactor, catalytic or non-catalytic, capable of reducing the sulfur-containing compounds other than hydrogen sulfide to hydrogen sulfide. Optionally, hydrogen included in tail gas stream 220 can be used for reducing the sulfur-containing compounds to hydrogen sulfide. Optionally, a make-up hydrogen gas stream (not shown) can be introduced to hydrogenation reactor 204. Optionally, water can be produced as a byproduct during the hydrogenation reaction. As a result, hydrogenated gas stream 222 includes sulfur-containing compounds of substantially hydrogen sulfide only. Hydrogenated gas stream 222 can also include carbon dioxide, water, nitrogen, and combinations of the same.

First heat exchanger 205 can be any heat exchanger capable of cooling a gas stream, in exchange of heating a separate gas stream, to a temperature suitable for the operation of quench tower 206. First heat exchanger 205 can cool hydrogenated gas stream 222 such that hydrogenated gas stream 224 has a temperature between about 20° C. and about 170° C., alternately between about 30° C. and about 100° C., or alternately between about 40° C. and about 80° C. In at least one embodiment, the temperature of hydrogenated gas stream 224 is about 43° C. Hydrogenated gas stream 224 can include the sulfur-containing compounds, carbon dioxide, water, nitrogen, hydrogen, and combinations of the same. In some embodiments, first heat exchanger 205 can heat second byproduct stream 242 such that second byproduct stream 243 has a temperature between about 150° C. and about 350° C., alternately between about 200° C. and about 300° C., and alternately between about 230° C. and about 290° C. In at least one embodiment, the temperature of second byproduct stream 243 is about 260° C.

Optionally, third heat exchanger 214 can be used to heat second byproduct stream 243 to meet the temperature requirements of adsorbent regeneration for each of first stage adsorption unit 210 and second stage adsorption unit 212. Third heat exchanger 214 can be any heat exchanger capable of heating a gas stream to a temperature at which adsorbent regeneration occurs in each of first stage adsorption unit 210 and second stage adsorption unit 212. Third heat exchanger 214 can heat second byproduct stream 243 such that second byproduct stream 245 (and each of first regeneration gas stream 244 and second regeneration gas stream 246) has a temperature between about 150° C. and about 350° C., alternately between about 200° C. and about 300° C., and alternately between about 230° C. and about 290° C. In at least one embodiment, the temperature of second byproduct stream 245 (and each of first regeneration gas stream 244 and second regeneration gas stream 246) is about 260° C.

Quench tower 206 can be any apparatus capable of condensing and recovering water. A significant portion of water included in hydrogenated gas stream 224 is condensed and substantially recovered via first water condensate stream 228. Although a significant portion of water included in hydrogenated gas stream 224 is removed, the resulting quenched gas stream 226 can still include residual amounts of gas phase water. Quenched gas stream 226 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 226 is about 8 mol %. Quenched gas stream 226 can also include hydrogen sulfide (that is, the hydrogen sulfide preexisting in the Claus tail gas or produced in hydrogenation reactor 204, or both), carbon dioxide, nitrogen, and combinations of the same. Quenched gas stream 226 has a temperature ranging between about 20° C. and about 170° C., alternately between about 30° C. and about 100° C., or alternately between about 40° C. and about 80° C. In at least one embodiment, the temperature of quenched gas stream 226 is about 43° C.

Compressor 207 can be any type of pressurizing device or apparatus capable of increasing the pressure of quenched gas stream 226. In at least one embodiment, compressor 207 is a diaphragm metering pump. The pressure of quenched gas stream 226 is increased via compressor 207 such that quenched gas stream 227 has a pressure ranging between about 1 bar and about 10 bar, alternately between about 1 bar and about 5 bar, or alternately between about 2 bar and about 4 bar. In at least one embodiment, the pressure of quenched gas stream 227 is about 3 bar.

Second heat exchanger 208 can be any heat exchanger capable of cooling a gas stream to a temperature at which adsorption occurs in first stage adsorption unit 210. Second heat exchanger 208 can cool quenched gas stream 227 such that quenched gas stream 229 has a temperature ranging between about 0° C. and about 50° C., alternately between about 5° C. and about 40° C., and alternately between about 10° C. and about 30° C. In at least one embodiment, the temperature of quenched gas stream 229 is about 15° C. As quenched gas stream 227 is cooled, the gas phase water content of quenched gas stream 229 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 229 is about 0.46 mol %. Quenched gas stream 229 can include hydrogen sulfide (that is, the hydrogen sulfide preexisting in the Claus tail gas or produced in hydrogenation reactor 204, or both), carbon dioxide, water, nitrogen, and combinations of the same.

Collection drum 209 can be any type of separation device capable of separating a fluid stream into a gas phase stream and a liquid phase stream. Quenched gas stream 229 is separated in collection drum 209 to produce second water condensate stream 231 (a liquid phase stream) and adsorption feed stream 230 (a gas phase stream). Adsorption feed stream 230 can include hydrogen sulfide (that is, the hydrogen sulfide preexisting in the Claus tail gas or produced in hydrogenation reactor 204, or both), carbon dioxide, water, nitrogen, and combinations of the same.

In some embodiments, first water condensate stream 228 can include trace quantities of hydrogen sulfide dissolved in water collected from quench tower 206. In some embodiments, second water condensate stream 231 can include trace quantities of hydrogen sulfide dissolved in water collected from collection drum 209. Each of first water condensate stream 228 and second water condensate stream 231 can be introduced to sour water stripper 260 for further processing such as stripping hydrogen sulfide from water.

First stage adsorption unit 210 includes first stage adsorption vessels 250, 251, 252 fluidly connected in a parallel manner. At any given moment during operation, one of first stage adsorption vessels 250, 251, 252 is undergoing an adsorption cycle, one of first stage adsorption vessels 250, 251, 252 is undergoing a regeneration cycle, and one of first stage adsorption vessels 250, 251, 252 is standing by. In this manner, components of adsorption feed stream 230 can be continuously fed to first stage adsorption unit 210 and a continuous flow of first outlet gas stream 232 and first byproduct stream 236 can be produced from first stage adsorption unit 210.

Each of first stage adsorption vessels 250, 251, 252 is filled with a first adsorbent. The first adsorbent can include any adsorbent capable of selectively capturing water from a wet gas stream (such as adsorption feed stream 230) while rejecting hydrogen sulfide, carbon dioxide, and nitrogen. Non-limiting example materials used for the first adsorbent include hydrophilic 3 Å molecular sieves as shown for example in U.S. Pat. Pub. No. 2017/0190574, which is incorporated in this disclosure by reference in its entirety. During the adsorption cycle, components of adsorption feed stream 230 are introduced through one of first stage adsorption vessels 250, 251, 252. Water is captured in the pores of the first adsorbent. Components other than water (that is, hydrogen sulfide, carbon dioxide, and nitrogen) pass through the first adsorbent to produce first outlet gas stream 232 substantially in the absence of water. During the regeneration cycle, components of first regeneration gas stream 244 (that is, carbon dioxide and nitrogen) enter one of first stage adsorption vessels 250, 251, 252 to regenerate the first adsorbent. Desorption occurs in one of first stage adsorption vessels 250, 251, 252, where the first adsorbent releases the captured water (and optionally trace quantities of carbon dioxide and nitrogen) which can be collected via first byproduct stream 236.

As shown in FIGS. 2A and B, first stage adsorption vessel 250 is undergoing the adsorption cycle, first stage adsorption vessel 251 is undergoing the regeneration cycle, and first stage adsorption vessel 252 is in standby mode. During the adsorption cycle, components of adsorption feed stream 230 are introduced through first stage adsorption vessel 250. Water is captured in the pores of the first adsorbent. In some embodiments, trace quantities of carbon dioxide and nitrogen can be captured in the pores of the first adsorbent. Components other than water (that is, hydrogen sulfide, carbon dioxide, and nitrogen) pass through the first adsorbent to produce first outlet gas stream 232 substantially in the absence of water. During the regeneration cycle, components of first regeneration gas stream 244 (that is, carbon dioxide and nitrogen) enter first stage adsorption vessel 251 to regenerate the first adsorbent. Desorption occurs in first stage adsorption vessel 251, where the first adsorbent releases the captured water (and optionally trace quantities of carbon dioxide and nitrogen) which can be collected via first byproduct stream 236.

In some embodiments, trace quantities of hydrogen sulfide can be captured in the pores of the first adsorbent. Upon regeneration, first byproduct stream 236 can be introduced to thermal oxidizer 262 for further processing, as shown in FIG. 2A, if the concentration of hydrogen sulfide in first byproduct stream 236 is less than about 10 parts per million (ppm). Alternately, upon regeneration, first byproduct stream 236 can be introduced to quench tower 206, as shown in FIG. 2B, if the concentration of hydrogen sulfide in first byproduct stream 236 is greater than about 10 ppm.

Second stage adsorption unit 212 includes second stage adsorption vessels 255, 256, 257 fluidly connected in a parallel manner. At any given moment during operation, one of second stage adsorption vessels 255, 256, 257 is undergoing an adsorption cycle, one of second stage adsorption vessels 255, 256, 257 is undergoing a regeneration cycle, and one of second stage adsorption vessels 255, 256, 257 is standing by. In this manner, components of first outlet gas stream 232 can be continuously fed to second stage adsorption unit 212 and a continuous flow of second outlet gas stream 240 and second byproduct stream 238 can be produced from second stage adsorption unit 212.

Each of second stage adsorption vessels 255, 256, 257 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. In at least one embodiment, the second adsorbent includes a Cu-Y type zeolite, which is a derivative of an FAU type zeolite including copper cations as counterions. During the adsorption cycle, components of first outlet gas stream 232 are introduced through one or more second stage adsorption vessels 255, 256, 257. Hydrogen sulfide is captured in the pores of the second adsorbent. Components other than hydrogen sulfide (that is, carbon dioxide and nitrogen) pass through the second adsorbent and are subsequently collected via second byproduct stream 238. During the regeneration cycle, components of second regeneration gas stream 246 (that is, carbon dioxide and nitrogen) enter one or more second stage adsorption vessels 255, 256, 257 to regenerate the second adsorbent. Desorption occurs in one or more second stage adsorption vessels 255, 256, 257, where the second adsorbent releases the captured hydrogen sulfide (and optionally trace quantities of carbon dioxide and nitrogen) to produce second outlet gas stream 240. Second outlet gas stream 240 includes hydrogen sulfide, carbon dioxide, and nitrogen.

As shown in FIGS. 2A and B, second stage adsorption vessel 255 is undergoing the adsorption cycle, second stage adsorption vessel 256 is undergoing the regeneration cycle, and second stage adsorption vessel 257 is in standby mode. During the adsorption cycle, components of first outlet gas stream 232 are introduced through second stage adsorption vessel 255. Hydrogen sulfide is captured in the pores of the second adsorbent. In some embodiments, trace quantities of carbon dioxide and nitrogen can be captured in the pores of the second adsorbent. Components other than hydrogen sulfide (that is, carbon dioxide and nitrogen) pass through the second adsorbent to produce second byproduct stream 238 substantially in the absence of hydrogen sulfide. During the regeneration cycle, components of second regeneration gas stream 246 (that is, carbon dioxide and nitrogen) enter second stage adsorption vessel 256 to regenerate the second adsorbent. Desorption occurs in second stage adsorption vessel 256, where the second adsorbent releases the captured hydrogen sulfide (and optionally trace quantities of carbon dioxide and nitrogen) which can be collected via second outlet gas stream 240.

Second outlet gas stream 240 includes hydrogen sulfide, carbon dioxide, and nitrogen. Second outlet gas stream 240 has a hydrogen sulfide content ranging between about 0 wt. % and about 99 wt. %, alternately between about 5 wt. % and about 70 wt. %, alternately between about 5 wt. % and about 50 wt. %, alternately between about 5 wt. % and about 30 wt. %, and alternately between about 10 wt. % and about 20 wt. %. In at least one embodiment, second outlet gas stream 240 has a hydrogen sulfide content of about 13.3 wt. %. Second outlet gas stream 240 has a carbon dioxide content ranging between about 0 wt. % and about 99 wt. %, alternately between about 20 wt. % and about 95 wt. %, alternately between about 30 wt. % and about 90 wt. %, alternately between about 50 wt. % and about 80 wt. %, and alternately between about 60 wt. % and about 70 wt. %. In at least one embodiment, second outlet gas stream 240 has a carbon dioxide content of about 66.7 wt. %. Second outlet gas stream 240 has a nitrogen content ranging between about 0 wt. % and about 99 wt. %, alternately between about 5 wt. % and about 70 wt. %, alternately between about 5 wt. % and about 50 wt. %, alternately between about 10 wt. % and about 30 wt. %, and alternately between about 15 wt. % and about 25 wt. %. In at least one embodiment, second outlet gas stream 240 has a nitrogen content of about 20.0 wt. %. In some embodiments, second outlet gas stream 240 can be used as a feed gas for the Claus unit. As shown in FIGS. 2A and B, second outlet gas stream 240 can be introduced to reaction furnace 264 of the Claus unit.

Figure 3A:
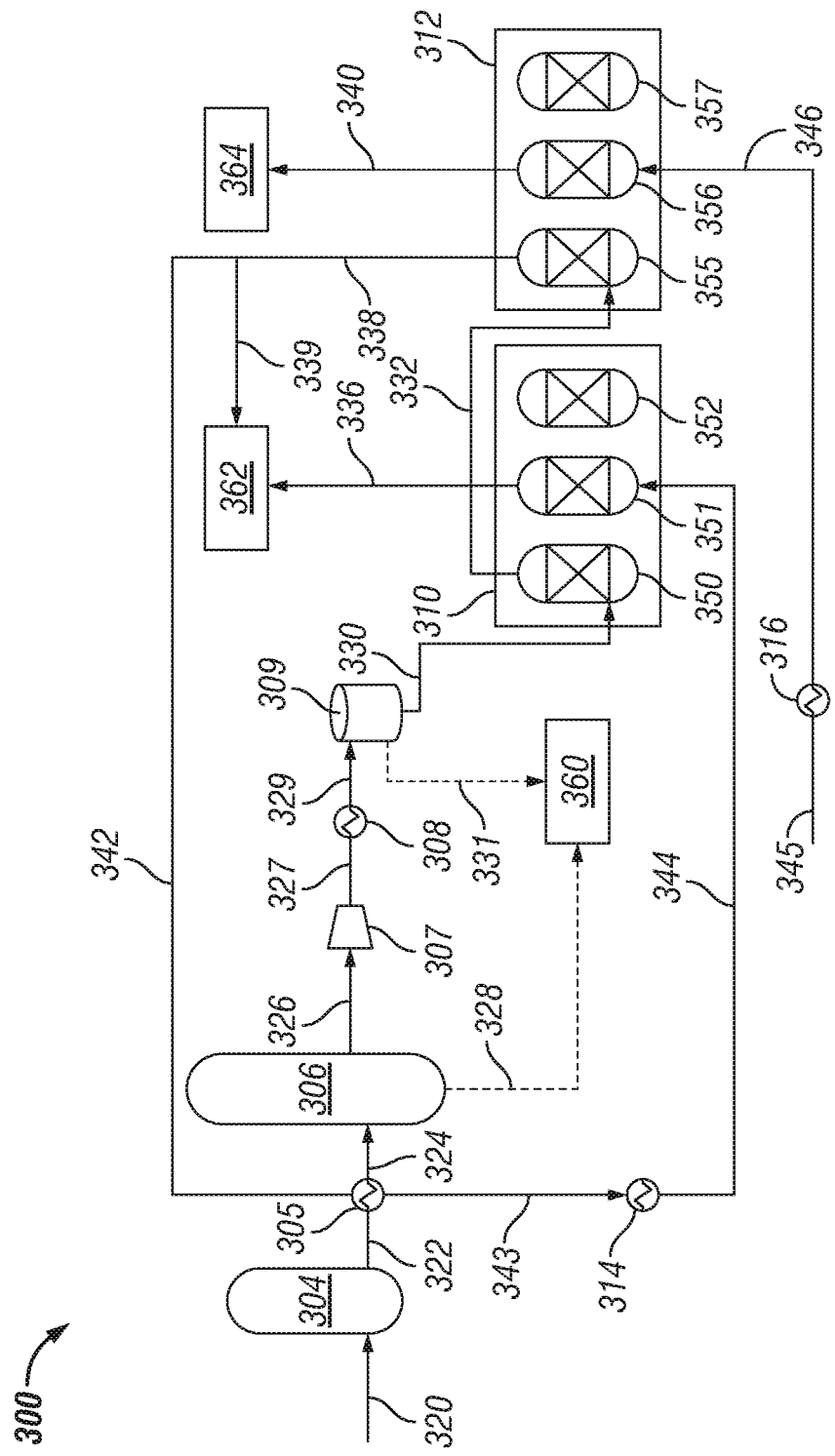
FIGS. 3A and B are schematic diagrams of a process for Claus tail gas treatment according to an embodiment of the disclosure.

FIGS. 3A and B show schematic diagrams of process 300 for an embodiment of the Claus tail gas treatment and regeneration system. Process 300 can include hydrogenation reactor 304, first heat exchanger 305, quench tower 306, compressor 307, second heat exchanger 308, collection drum 309, first stage adsorption unit 310, second stage adsorption unit 312, third heat exchanger 314, and fourth heat exchanger 316.

In one embodiment, as shown in FIG. 3A, tail gas stream 320 is introduced to hydrogenation reactor 304 to produce hydrogenated gas stream 322. Hydrogenated gas stream 322 is cooled via first heat exchanger 305 to produce hydrogenated gas stream 324. Hydrogenated gas stream 324 is introduced to quench tower 306 to produce quenched gas stream 326 and first water condensate stream 328. Quenched gas stream 326 is pressurized by compressor 307 to produce quenched gas stream 327. Quenched gas stream 327 is cooled by second heat exchanger 308 to produce quenched gas stream 329. Quenched gas stream 329 is introduced to collection drum 309 to produce second water condensate stream 331 and adsorption feed stream 330. First water condensate stream 328 and second water condensate stream 331 can be introduced to sour water stripper 360 for further processing. Adsorption feed stream 330 is introduced to first stage adsorption vessel 350 of first stage adsorption unit 310 to produce first outlet gas stream 332. First outlet gas stream 332 is introduced to second stage adsorption vessel 355 of second stage adsorption unit 312 to produce second byproduct stream 338. Second byproduct stream 338 can be separated into second byproduct stream 339 and second byproduct stream 342. Second byproduct stream 342 is heated via first heat exchanger 305 to produce second byproduct stream 343 by exchanging heat from hydrogenated gas stream 322. Optionally, second byproduct stream 343 can be further heated via third heat exchanger 314 to produce first regeneration gas stream 344. First regeneration gas stream 344 is introduced to first stage adsorption vessel 351 of first stage adsorption unit 310 to produce first byproduct stream 336. Second byproduct stream 339 and first byproduct stream 336 can be introduced to thermal oxidizer 362 for further processing. Sales gas stream 345 is heated via fourth heat exchanger 316 to produce second regeneration gas stream 346. Second regeneration gas stream 346 is introduced to second stage adsorption vessel 356 of second stage adsorption unit 312 to produce second outlet gas stream 340. Second outlet gas stream 340 can be introduced to reaction furnace 364 of a Claus unit for further processing.

Figure 3B:
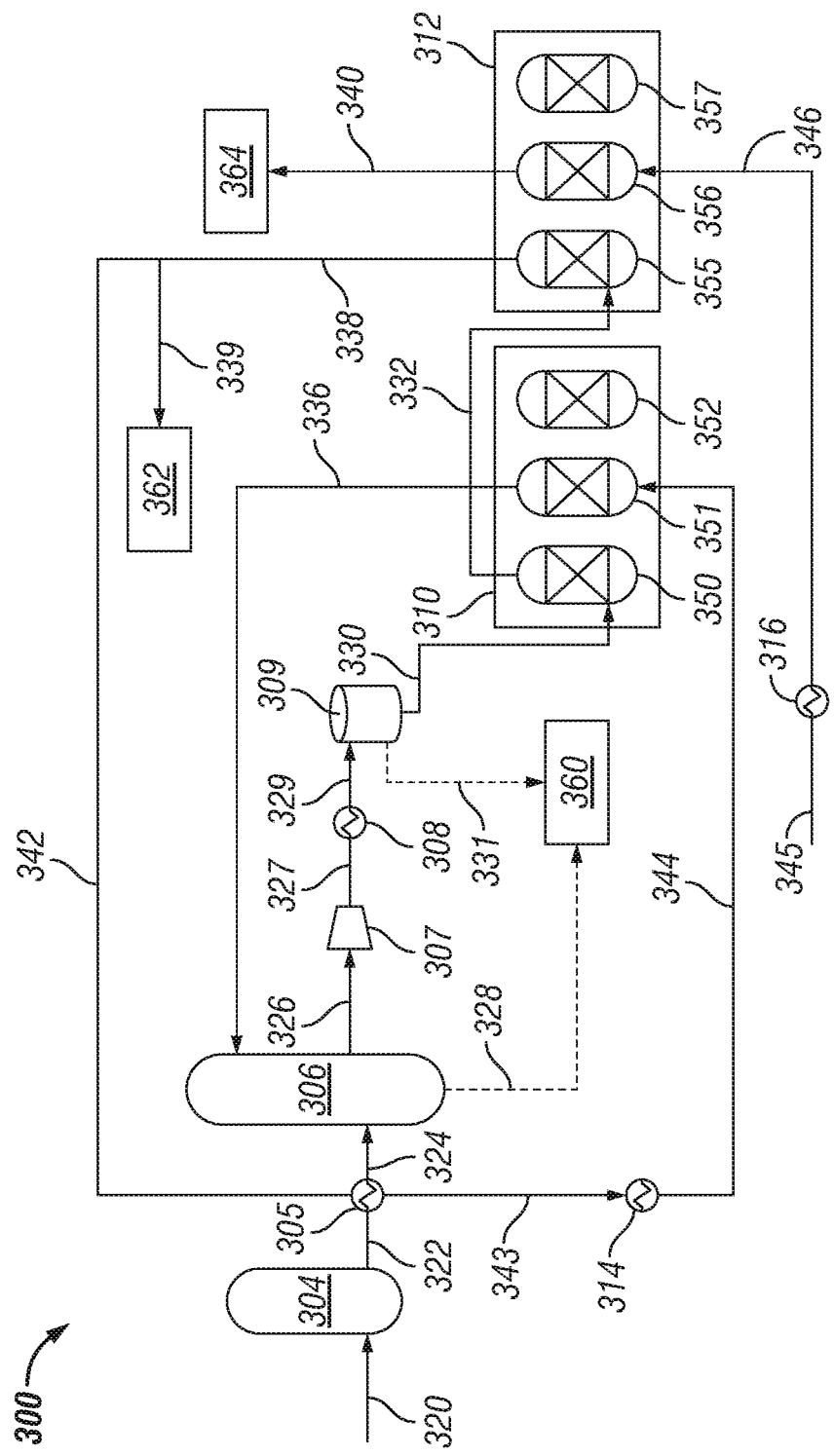

In an alternate embodiment, as shown in FIG. 3B, tail gas stream 320 is introduced to hydrogenation reactor 304 to produce hydrogenated gas stream 322. Hydrogenated gas stream 322 is cooled via first heat exchanger 305 to produce a hydrogenated gas stream 324. Hydrogenated gas stream 324 is introduced to quench tower 306 to produce quenched gas stream 326 and first water condensate stream 328. Quenched gas stream 326 is pressurized by compressor 307 to produce quenched gas stream 327. Quenched gas stream 327 is cooled by second heat exchanger 308 to produce quenched gas stream 329. Quenched gas stream 329 is introduced to collection drum 309 to produce second water condensate stream 331 and adsorption feed stream 330. First water condensate stream 328 and second water condensate stream 331 can be introduced to sour water stripper 360 for further processing. Adsorption feed stream 330 is introduced to first stage adsorption vessel 350 of first stage adsorption unit 310 to produce first outlet gas stream 332. First outlet gas stream 332 is introduced to second stage adsorption vessel 355 of second stage adsorption unit 312 to produce second byproduct stream 338. Second byproduct stream 338 can be separated into second byproduct stream 339 and second byproduct stream 342. Second byproduct stream 339 can be introduced to thermal oxidizer 362 for further processing. Second byproduct stream 342 is heated via first heat exchanger 305 to produce second byproduct stream 343 by exchanging heat from hydrogenated gas stream 322. Optionally, second byproduct stream 343 can be further heated via third heat exchanger 314 to produce first regeneration gas stream 344. First regeneration gas stream 344 is introduced to first stage adsorption vessel 351 of first stage adsorption unit 310 to produce first byproduct stream 336. First byproduct stream 336 is introduced to quench tower 306. Sales gas stream 345 is heated via fourth heat exchanger 316 to produce second regeneration gas stream 346. Second regeneration gas stream 346 is introduced to second stage adsorption vessel 356 of second stage adsorption unit 312 to produce second outlet gas stream 340. Second outlet gas stream 340 can be introduced to reaction furnace 364 of a Claus unit for further processing.

Tail gas stream 320 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

Optionally, tail gas stream 320 can be preheated to a temperature at which hydrogenation reactions can occur in hydrogenation reactor 304. Tail gas stream 320 can be preheated to a temperature between about 200° C. and about 300° C., alternately between about 220° C. and about 280° C., and alternately between about 240° C. and about 260° C. In at least one embodiment, tail gas stream 320 can be preheated to a temperature of about 250° C.

Hydrogenation reactor 304 can be any reactor, catalytic or non-catalytic, capable of reducing the sulfur-containing compounds other than hydrogen sulfide to hydrogen sulfide. Optionally, hydrogen included in tail gas stream 320 can be used for reducing the sulfur-containing compounds to hydrogen sulfide. Optionally, a make-up hydrogen gas stream (not shown) can be introduced to hydrogenation reactor 304. Optionally, water can be produced as a byproduct during the hydrogenation reaction. As a result, hydrogenated gas stream 322 includes sulfur-containing compounds of substantially hydrogen sulfide only. Hydrogenated gas stream 322 can also include carbon dioxide, water, nitrogen, and combinations of the same.

First heat exchanger 305 can be any heat exchanger capable of cooling a gas stream, in exchange of heating a separate gas stream, to a temperature suitable for the operation of quench tower 306. First heat exchanger 305 can cool hydrogenated gas stream 322 such that hydrogenated gas stream 324 has a temperature between about 20° C. and about 170° C., alternately between about 30° C. and about 100° C., or alternately between about 40° C. and about 80° C. In at least one embodiment, the temperature of hydrogenated gas stream 324 is about 43° C. Hydrogenated gas stream 324 can include the sulfur-containing compounds, carbon dioxide, water, nitrogen, hydrogen, and combinations of the same. In some embodiments, first heat exchanger 305 can heat second byproduct stream 342 such that second byproduct stream 343 has a temperature between about 150° C. and about 350° C., alternately between about 200° C. and about 300° C., and alternately between about 230° C. and about 290° C. In at least one embodiment, the temperature of second byproduct stream 343 is about 260° C.

Optionally, third heat exchanger 314 can be used to heat second byproduct stream 343 to meet the temperature requirements of adsorbent regeneration for first stage adsorption unit 310. Third heat exchanger 314 can be any heat exchanger capable of heating a gas stream to a temperature at which adsorbent regeneration occurs in first stage adsorption unit 310. Third heat exchanger 314 can heat second byproduct stream 343 such that first regeneration gas stream 344 has a temperature between about 150° C. and about 350° C., alternately between about 200° C. and about 300° C., and alternately between about 230° C. and about 290° C. In at least one embodiment, the temperature of first regeneration gas stream 344 is about 260° C.

Sales gas stream 345 includes a sales gas. As used throughout the disclosure, the term "sales gas" refers to a sales quality natural gas which has undergone processing to remove impurities such as hydrogen sulfide, carbon dioxide, water, and hydrocarbons having a boiling point greater than about 30° C. Sales gas typically includes methane and ethane. Sales gas can be odorized. Sales gas can have a methane content of greater than about 95 wt. %. Sales gas can have a nitrogen content of less than about 5 wt. %.

Fourth heat exchanger 316 can be any heat exchanger capable of heating a gas stream to a temperature at which adsorbent regeneration occurs in second stage adsorption unit 312. Fourth heat exchanger 316 can heat sales gas stream 345 such that second regeneration gas stream 346 has a temperature between about 150° C. and about 350° C., alternately between about 200° C. and about 300° C., and alternately between about 230° C. and about 290° C. In at least one embodiment, the temperature of second regeneration gas stream 346 is about 260° C.

Quench tower 306 can be any apparatus capable of condensing and recovering water. A significant portion of water included in hydrogenated gas stream 324 is condensed and substantially recovered via first water condensate stream 328. Although a significant portion of water included in hydrogenated gas stream 324 is removed, the resulting quenched gas stream 326 can still include residual amounts of gas phase water. Quenched gas stream 326 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 326 is about 8 mol %. Quenched gas stream 326 can also include hydrogen sulfide (that is, the hydrogen sulfide preexisting in the Claus tail gas or produced in hydrogenation reactor 304, or both), carbon dioxide, nitrogen, and combinations of the same. Quenched gas stream 326 has a temperature ranging between about 20° C. and about 170° C., alternately between about 30° C. and about 100° C., or alternately between about 40° C. and about 80° C. In at least one embodiment, the temperature of quenched gas stream 326 is about 43° C.

Compressor 307 can be any type of pressurizing device or apparatus capable of increasing the pressure of quenched gas stream 326. In at least one embodiment, compressor 307 is a diaphragm metering pump. The pressure of quenched gas stream 326 is increased via compressor 307 such that quenched gas stream 327 has a pressure ranging between about 1 bar and about 10 bar, alternately between about 1 bar and about 5 bar, or alternately between about 2 bar and about 4 bar. In at least one embodiment, the pressure of quenched gas stream 327 is about 3 bar.

Second heat exchanger 308 can be any heat exchanger capable of cooling a gas stream to a temperature at which adsorption occurs in first stage adsorption unit 310. Second heat exchanger 308 can cool quenched gas stream 327 such that quenched gas stream 329 has a temperature ranging between about 0° C. and about 50° C., alternately between about 5° C. and about 40° C., and alternately between about 10° C. and about 30° C. In at least one embodiment, the temperature of quenched gas stream 329 is about 15° C. As quenched gas stream 327 is cooled, the gas phase water content of quenched gas stream 329 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 329 is about 0.46 mol %. Quenched gas stream 329 can include hydrogen sulfide (that is, the hydrogen sulfide preexisting in the Claus tail gas or produced in hydrogenation reactor 304, or both), carbon dioxide, water, nitrogen, and combinations of the same.

Collection drum 309 can be any type of separation device capable of separating a fluid stream into a gas phase stream and a liquid phase stream. Quenched gas stream 329 is separated in collection drum 309 to produce second water condensate stream 331 (a liquid phase stream) and adsorption feed stream 330 (a gas phase stream). Adsorption feed stream 330 can include hydrogen sulfide (that is, the hydrogen sulfide preexisting in the Claus tail gas or produced in hydrogenation reactor 304, or both), carbon dioxide, water, nitrogen, and combinations of the same.

In some embodiments, first water condensate stream 328 can include trace quantities of hydrogen sulfide dissolved in water collected from quench tower 306. In some embodiments, second water condensate stream 331 can include trace quantities of hydrogen sulfide dissolved in water collected from collection drum 309. Each of first water condensate stream 328 and second water condensate stream 331 can be introduced to sour water stripper 360 for further processing such as stripping hydrogen sulfide from water.

First stage adsorption unit 310 includes first stage adsorption vessels 350, 351, 352 fluidly connected in a parallel manner. At any given moment during operation, one of first stage adsorption vessels 350, 351, 352 is undergoing an adsorption cycle, one of first stage adsorption vessels 350, 351, 352 is undergoing a regeneration cycle, and one of first stage adsorption vessels 350, 351, 352 is standing by. In this manner, components of adsorption feed stream 330 can be continuously fed to first stage adsorption unit 310 and a continuous flow of first outlet gas stream 332 and first byproduct stream 336 can be produced from first stage adsorption unit 310.

Each of first stage adsorption vessels 350, 351, 352 is filled with a first adsorbent. The first adsorbent can include any adsorbent capable of selectively capturing water from a wet gas stream (such as adsorption feed stream 330) while rejecting hydrogen sulfide, carbon dioxide, and nitrogen. Non-limiting example materials used for the first adsorbent include hydrophilic 3 Å molecular sieves as shown for example in U.S. Pat. Pub. No. 2017/0190574, which is incorporated in this disclosure by reference in its entirety. During the adsorption cycle, components of adsorption feed stream 330 are introduced through one of first stage adsorption vessels 350, 351, 352. Water is captured in the pores of the first adsorbent. Components other than water (that is, hydrogen sulfide, carbon dioxide, and nitrogen) pass through the first adsorbent to produce first outlet gas stream 332 substantially in the absence of water. During the regeneration cycle, components of first regeneration gas stream 344 (that is, carbon dioxide and nitrogen) enter one of first stage adsorption vessels 350, 351, 352 to regenerate the first adsorbent. Desorption occurs in one of first stage adsorption vessels 350, 351, 352, where the first adsorbent releases the captured water (and optionally trace quantities of carbon dioxide and nitrogen) which can be collected via first byproduct stream 336.

As shown in FIGS. 3A and B, first stage adsorption vessel 350 is undergoing the adsorption cycle, first stage adsorption vessel 351 is undergoing the regeneration cycle, and first stage adsorption vessel 352 is in standby mode. During the adsorption cycle, components of adsorption feed stream 330 are introduced through first stage adsorption vessel 350. Water is captured in the pores of the first adsorbent. In some embodiments, trace quantities of carbon dioxide and nitrogen can be captured in the pores of the first adsorbent. Components other than water (that is, hydrogen sulfide, carbon dioxide, and nitrogen) pass through the first adsorbent to produce first outlet gas stream 332 substantially in the absence of water. During the regeneration cycle, components of first regeneration gas stream 344 (that is, carbon dioxide and nitrogen) enter first stage adsorption vessel 351 to regenerate the first adsorbent. Desorption occurs in first stage adsorption vessel 351, where the first adsorbent releases the captured water (and optionally trace quantities of carbon dioxide and nitrogen) which can be collected via first byproduct stream 336.

In some embodiments, trace quantities of hydrogen sulfide can be captured in the pores of the first adsorbent. Upon regeneration, first byproduct stream 336 can be introduced to thermal oxidizer 362 for further processing, as shown in FIG. 3A, if the concentration of hydrogen sulfide in first byproduct stream 336 is less than about 10 ppm. Alternately, upon regeneration, first byproduct stream 336 can be introduced to quench tower 306, as shown in FIG. 3B, if the concentration of hydrogen sulfide in first byproduct stream 336 is greater than about 10 ppm.

Second stage adsorption unit 312 includes second stage adsorption vessels 355, 356, 357 fluidly connected in a parallel manner. At any given moment during operation, one of second stage adsorption vessels 355, 356, 357 is undergoing an adsorption cycle, one of second stage adsorption vessels 355, 356, 357 is undergoing a regeneration cycle, and one of second stage adsorption vessels 355, 356, 357 is standing by. In this manner, components of first outlet gas stream 332 can be continuously fed to second stage adsorption unit 312 and a continuous flow of second outlet gas stream 340 and second byproduct stream 338 can be produced from second stage adsorption unit 312.

Each of second stage adsorption vessels 355, 356, 357 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. In at least one embodiment, the second adsorbent includes a Cu-Y type zeolite, which is a derivative of an FAU type zeolite including copper cations as counterions. During the adsorption cycle, components of first outlet gas stream 332 are introduced through one or more second stage adsorption vessels 355, 356, 357. Hydrogen sulfide is captured in the pores of the second adsorbent. Components other than hydrogen sulfide (that is, carbon dioxide and nitrogen) pass through the second adsorbent and are subsequently collected via second byproduct stream 338. During the regeneration cycle, components of second regeneration gas stream 346 (that is, sales gas) enter one or more second stage adsorption vessels 355, 356, 357 to regenerate the second adsorbent. Desorption occurs in one or more second stage adsorption vessels 355, 356, 357, where the second adsorbent releases the captured hydrogen sulfide (and optionally trace quantities of carbon dioxide and nitrogen) to produce second outlet gas stream 340. Second outlet gas stream 340 includes hydrogen sulfide, sales gas, and optionally trace quantities of carbon dioxide and nitrogen.

As shown in FIGS. 3A and B, second stage adsorption vessel 355 is undergoing the adsorption cycle, second stage adsorption vessel 356 is undergoing the regeneration cycle, and second stage adsorption vessel 357 is in standby mode. During the adsorption cycle, components of first outlet gas stream 332 are introduced through second stage adsorption vessel 355. Hydrogen sulfide is captured in the pores of the second adsorbent. In some embodiments, trace quantities of carbon dioxide and nitrogen can be captured in the pores of the second adsorbent. Components other than hydrogen sulfide (that is, carbon dioxide and nitrogen) pass through the second adsorbent to produce second byproduct stream 338 substantially in the absence of hydrogen sulfide. During the regeneration cycle, components of second regeneration gas stream 346 (that is, sales gas) enter second stage adsorption vessel 356 to regenerate the second adsorbent. Desorption occurs in second stage adsorption vessel 356, where the second adsorbent releases the captured hydrogen sulfide (and optionally trace quantities of carbon dioxide and nitrogen) which can be collected via second outlet gas stream 340.

Second outlet gas stream 340 includes hydrogen sulfide and sales gas. Second outlet gas stream 340 has a hydrogen sulfide content ranging between about 0 wt. % and about 99 wt. %, alternately between about 5 wt. % and about 70 wt. %, alternately between about 5 wt. % and about 50 wt. %, alternately between about 5 wt. % and about 30 wt. %, and alternately between about 10 wt. % and about 20 wt. %. In at least one embodiment, second outlet gas stream 340 has a hydrogen sulfide content of about 13.3 wt. %. Second outlet gas stream 340 has a sales gas content ranging between about 0 wt. % and about 99 wt. %, alternately between about 20 wt. % and about 95 wt. %, alternately between about 30 wt. % and about 90 wt. %, alternately between about 50 wt. % and about 80 wt. %, and alternately between about 60 wt. % and about 70 wt. %. In at least one embodiment, second outlet gas stream 340 has a sales gas content of about 70 wt. %. In some embodiments, second outlet gas stream 340 can be used as a feed gas for the Claus unit. As shown in FIGS. 3A and B, second outlet gas stream 340 can be introduced to reaction furnace 364 of the Claus unit.

Figure 4A:
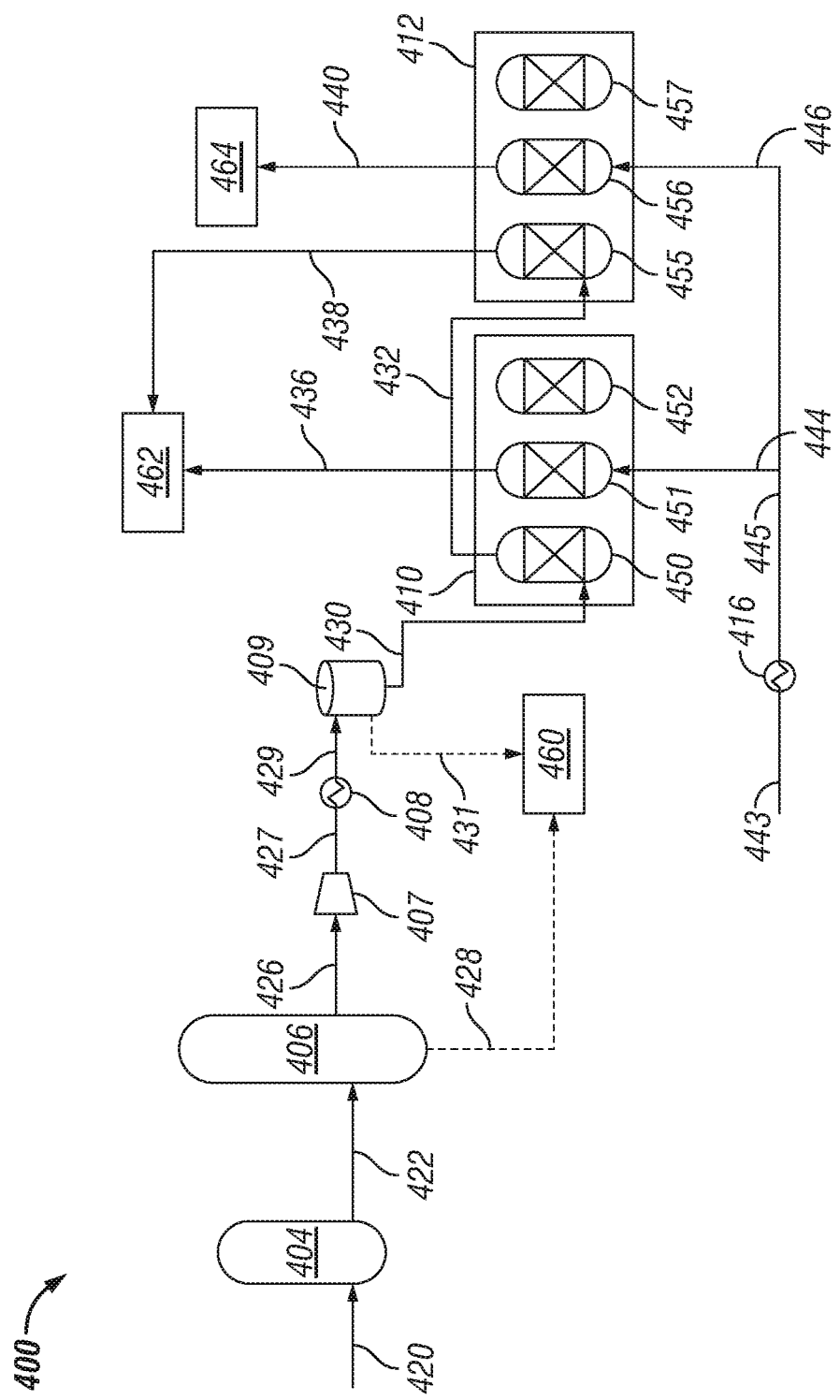
FIGS. 4A and B are schematic diagrams of a process for Claus tail gas treatment according to an embodiment of the disclosure.

FIGS. 4A and B show schematic diagrams of process 400 for an embodiment of the Claus tail gas treatment system. Process 400 can include hydrogenation reactor 404, quench tower 406, compressor 407, first heat exchanger 408, collection drum 409, first stage adsorption unit 410, second stage adsorption unit 412, and second heat exchanger 416.

In one embodiment, as shown in FIG. 4A, tail gas stream 420 is introduced to hydrogenation reactor 404 to produce hydrogenated gas stream 422. Hydrogenated gas stream 422 is introduced to quench tower 406 to produce quenched gas stream 426 and first water condensate stream 428. Quenched gas stream 426 is pressurized by compressor 407 to produce quenched gas stream 427. Quenched gas stream 427 is cooled by first heat exchanger 408 to produce quenched gas stream 429. Quenched gas stream 429 is introduced to collection drum 409 to produce second water condensate stream 431 and adsorption feed stream 430. First water condensate stream 428 and second water condensate stream 431 can be introduced to sour water stripper 460 for further processing. Adsorption feed stream 430 is introduced to first stage adsorption vessel 450 of first stage adsorption unit 410 to produce first outlet gas stream 432. First outlet gas stream 432 is introduced to second stage adsorption vessel 455 of second stage adsorption unit 412 to produce second byproduct stream 438. Nitrogen gas stream 443 is heated via second heat exchanger 416 to produce nitrogen gas stream 445. Nitrogen gas stream 445 is separated into first regeneration gas stream 444 and second regeneration gas stream 446. First regeneration gas stream 444 is introduced to first stage adsorption vessel 451 of first stage adsorption unit 410 to produce first byproduct stream 436. Second byproduct stream 438 and first byproduct stream 436 can be introduced to thermal oxidizer 462 for further processing. Second regeneration gas stream 446 is introduced to second stage adsorption vessel 456 of second stage adsorption unit 412 to produce second outlet gas stream 440. Second outlet gas stream 440 can be introduced to reaction furnace 464 of a Claus unit for further processing.

Figure 4B:
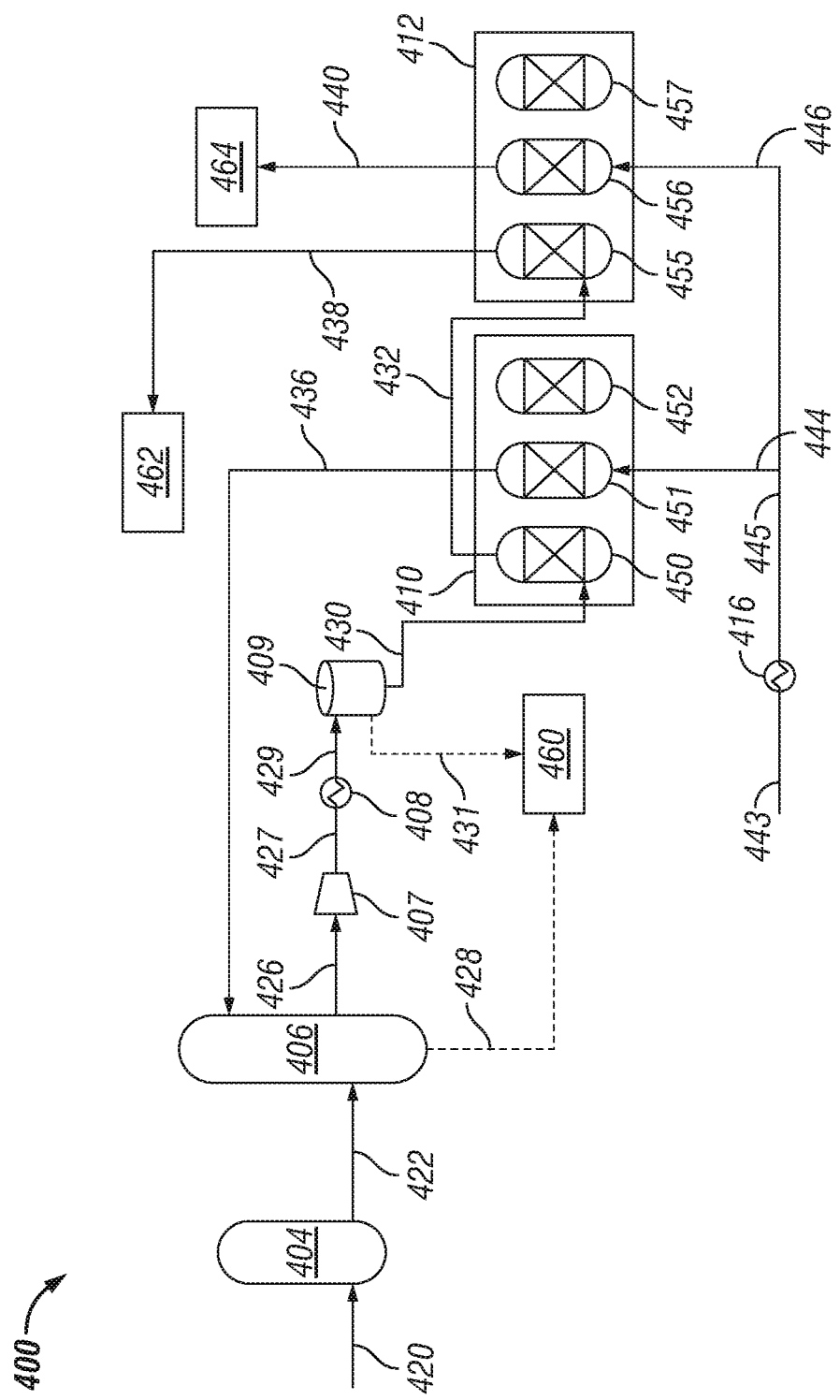

In an alternate embodiment, as shown in FIG. 4B, tail gas stream 420 is introduced to hydrogenation reactor 404 to produce hydrogenated gas stream 422. Hydrogenated gas stream 422 is introduced to quench tower 406 to produce quenched gas stream 426 and first water condensate stream 428. Quenched gas stream 426 is pressurized by compressor 407 to produce quenched gas stream 427. Quenched gas stream 427 is cooled by first heat exchanger 408 to produce quenched gas stream 429. Quenched gas stream 429 is introduced to collection drum 409 to produce second water condensate stream 431 and adsorption feed stream 430. First water condensate stream 428 and second water condensate stream 431 can be introduced to sour water stripper 460 for further processing. Adsorption feed stream 430 is introduced to first stage adsorption vessel 450 of first stage adsorption unit 410 to produce first outlet gas stream 432. First outlet gas stream 432 is introduced to second stage adsorption vessel 455 of second stage adsorption unit 412 to produce second byproduct stream 438. Second byproduct stream 438 can be introduced to thermal oxidizer 462 for further processing. Nitrogen gas stream 443 is heated via second heat exchanger 416 to produce nitrogen gas stream 445. Nitrogen gas stream 445 is separated into first regeneration gas stream 444 and second regeneration gas stream 446. First regeneration gas stream 444 is introduced to first stage adsorption vessel 451 of first stage adsorption unit 410 to produce first byproduct stream 436. First byproduct stream 436 is introduced to quench tower 406. Second regeneration gas stream 446 is introduced to second stage adsorption vessel 456 of second stage adsorption unit 412 to produce second outlet gas stream 440. Second outlet gas stream 440 can be introduced to reaction furnace 464 of a Claus unit for further processing.

Tail gas stream 420 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

Optionally, tail gas stream 420 can be preheated to a temperature at which hydrogenation reactions can occur in hydrogenation reactor 404. Tail gas stream 420 can be preheated to a temperature between about 200° C. and about 300° C., alternately between about 220° C. and about 280° C., and alternately between about 240° C. and about 260° C. In at least one embodiment, tail gas stream 420 can be preheated to a temperature of about 250° C.

Hydrogenation reactor 404 can be any reactor, catalytic or non-catalytic, capable of reducing the sulfur-containing compounds other than hydrogen sulfide to hydrogen sulfide. Optionally, hydrogen included in tail gas stream 420 can be used for reducing the sulfur-containing compounds to hydrogen sulfide. Optionally, a make-up hydrogen gas stream (not shown) can be introduced to hydrogenation reactor 404. Optionally, water can be produced as a byproduct during the hydrogenation reaction. As a result, hydrogenated gas stream 422 includes sulfur-containing compounds of substantially hydrogen sulfide only. Hydrogenated gas stream 422 can also include carbon dioxide, water, nitrogen, and combinations of the same. Hydrogenated gas stream 422 has a temperature between about 20° C. and about 300° C., alternately between about 20° C. and about 170° C., alternately between about 30° C. and about 100° C., or alternately between about 40° C. and about 80° C. In at least one embodiment, the temperature of hydrogenated gas stream 422 is about 43° C.

Nitrogen gas stream 443 includes nitrogen gas. In some embodiments, nitrogen gas can be obtained from a nitrogen separation unit such as a cryogenic unit.

Second heat exchanger 416 can be any heat exchanger capable of heating a gas stream to a temperature at which adsorbent regeneration occurs in each of first stage adsorption unit 410 and second stage adsorption unit 412. Second heat exchanger 416 can heat nitrogen gas stream 443 such that nitrogen gas stream 445 (and each of first regeneration gas stream 444 and second regeneration gas stream 446) has a temperature between about 150° C. and about 350° C., alternately between about 200° C. and about 300° C., and alternately between about 230° C. and about 290° C. In at least one embodiment, the temperature of nitrogen gas stream 445 (and each of first regeneration gas stream 444 and second regeneration gas stream 446) is about 260° C.

Quench tower 406 can be any apparatus capable of condensing and recovering water. A significant portion of water included in hydrogenated gas stream 422 is condensed and substantially recovered via first water condensate stream 428. Although a significant portion of water included in hydrogenated gas stream 422 is removed, the resulting quenched gas stream 426 can still include residual amounts of gas phase water. Quenched gas stream 426 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 426 is about 8 mol %. Quenched gas stream 426 can also include hydrogen sulfide (that is, the hydrogen sulfide preexisting in the Claus tail gas or produced in hydrogenation reactor 404, or both), carbon dioxide, nitrogen, and combinations of the same. Quenched gas stream 426 has a temperature ranging between about 20° C. and about 170° C., alternately between about 30° C. and about 100° C., or alternately between about 40° C. and about 80° C. In at least one embodiment, the temperature of quenched gas stream 426 is about 43° C.

Compressor 407 can be any type of pressurizing device or apparatus capable of increasing the pressure of quenched gas stream 426. In at least one embodiment, compressor 407 is a diaphragm metering pump. The pressure of quenched gas stream 426 is increased via compressor 407 such that quenched gas stream 427 has a pressure ranging between about 1 bar and about 10 bar, alternately between about 1 bar and about 5 bar, or alternately between about 2 bar and about 4 bar. In at least one embodiment, the pressure of quenched gas stream 427 is about 3 bar.

First heat exchanger 408 can be any heat exchanger capable of cooling a gas stream to a temperature at which adsorption occurs in first stage adsorption unit 410 First heat exchanger 408 can cool quenched gas stream 427 such that quenched gas stream 429 has a temperature ranging between about 0° C. and about 50° C., alternately between about 5° C. and about 40° C., and alternately between about 10° C. and about 30° C. In at least one embodiment, the temperature of quenched gas stream 429 is about 15° C. As quenched gas stream 427 is cooled, the gas phase water content of quenched gas stream 429 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 429 is about 0.46 mol %. Quenched gas stream 429 can include hydrogen sulfide (that is, the hydrogen sulfide preexisting in the Claus tail gas or produced in hydrogenation reactor 404, or both), carbon dioxide, water, nitrogen, and combinations of the same.

Collection drum 409 can be any type of separation device capable of separating a fluid stream into a gas phase stream and a liquid phase stream. Quenched gas stream 429 is separated in collection drum 409 to produce second water condensate stream 431 (a liquid phase stream) and adsorption feed stream 430 (a gas phase stream). Adsorption feed stream 430 can include hydrogen sulfide (that is, the hydrogen sulfide preexisting in the Claus tail gas or produced in hydrogenation reactor 404, or both), carbon dioxide, water, nitrogen, and combinations of the same.

In some embodiments, first water condensate stream 428 can include trace quantities of hydrogen sulfide dissolved in water collected from quench tower 406. In some embodiments, second water condensate stream 431 can include trace quantities of hydrogen sulfide dissolved in water collected from collection drum 409. Each of first water condensate stream 428 and second water condensate stream 431 can be introduced to sour water stripper 460 for further processing such as stripping hydrogen sulfide from water.

First stage adsorption unit 410 includes first stage adsorption vessels 450, 451, 452 fluidly connected in a parallel manner. At any given moment during operation, one of first stage adsorption vessels 450, 451, 452 is undergoing an adsorption cycle, one of first stage adsorption vessels 450, 451, 452 is undergoing a regeneration cycle, and one of first stage adsorption vessels 450, 451, 452 is standing by. In this manner, components of adsorption feed stream 430 can be continuously fed to first stage adsorption unit 410 and a continuous flow of first outlet gas stream 432 and first byproduct stream 436 can be produced from first stage adsorption unit 410.

Each of first stage adsorption vessels 450, 451, 452 is filled with a first adsorbent. The first adsorbent can include any adsorbent capable of selectively capturing water from a wet gas stream (such as adsorption feed stream 430) while rejecting hydrogen sulfide, carbon dioxide, and nitrogen. Non-limiting example materials used for the first adsorbent include hydrophilic 3 Å molecular sieves as shown for example in U.S. Pat. Pub. No. 2017/0190574, which is incorporated in this disclosure by reference in its entirety. During the adsorption cycle, components of adsorption feed stream 430 are introduced through one of first stage adsorption vessels 450, 451, 452. Water is captured in the pores of the first adsorbent. Components other than water (that is, hydrogen sulfide, carbon dioxide, and nitrogen) pass through the first adsorbent to produce first outlet gas stream 432 substantially in the absence of water. During the regeneration cycle, components of first regeneration gas stream 444 (that is, nitrogen) enter one of first stage adsorption vessels 450, 451, 452 to regenerate the first adsorbent. Desorption occurs in one of first stage adsorption vessels 450, 451, 452, where the first adsorbent releases the captured water (and optionally trace quantities of carbon dioxide and nitrogen) which can be collected via first byproduct stream 436.

As shown in FIGS. 4A and B, first stage adsorption vessel 450 is undergoing the adsorption cycle, first stage adsorption vessel 451 is undergoing the regeneration cycle, and first stage adsorption vessel 452 is in standby mode. During the adsorption cycle, components of adsorption feed stream 430 are introduced through first stage adsorption vessel 450. Water is captured in the pores of the first adsorbent. In some embodiments, trace quantities of carbon dioxide and nitrogen can be captured in the pores of the first adsorbent. Components other than water (that is, hydrogen sulfide, carbon dioxide, and nitrogen) pass through the first adsorbent to produce first outlet gas stream 432 substantially in the absence of water. During the regeneration cycle, components of first regeneration gas stream 444 (that is, nitrogen) enter first stage adsorption vessel 451 to regenerate the first adsorbent. Desorption occurs in first stage adsorption vessel 451, where the first adsorbent releases the captured water (and optionally trace quantities of carbon dioxide and nitrogen) which can be collected via first byproduct stream 436.

In some embodiments, trace quantities of hydrogen sulfide can be captured in the pores of the first adsorbent. Upon regeneration, first byproduct stream 436 can be introduced to thermal oxidizer 462 for further processing, as shown in FIG. 4A, if the concentration of hydrogen sulfide in first byproduct stream 436 is less than about 10 ppm. Alternately, upon regeneration, first byproduct stream 436 can be introduced to quench tower 406, as shown in FIG. 4B, if the concentration of hydrogen sulfide in first byproduct stream 436 is greater than about 10 ppm.

Second stage adsorption unit 412 includes second stage adsorption vessels 455, 456, 457 fluidly connected in a parallel manner. At any given moment during operation, one of second stage adsorption vessels 455, 456, 457 is undergoing an adsorption cycle, one of second stage adsorption vessels 455, 456, 457 is undergoing a regeneration cycle, and one of second stage adsorption vessels 455, 456, 457 is standing by. In this manner, components of first outlet gas stream 432 can be continuously fed to second stage adsorption unit 412 and a continuous flow of second outlet gas stream 440 and second byproduct stream 438 can be produced from second stage adsorption unit 412.

Each of second stage adsorption vessels 455, 456, 457 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. In at least one embodiment, the second adsorbent includes a Cu-Y type zeolite, which is a derivative of an FAU type zeolite including copper cations as counterions. During the adsorption cycle, components of first outlet gas stream 432 are introduced through one or more second stage adsorption vessels 455, 456, 457. Hydrogen sulfide is captured in the pores of the second adsorbent. Components other than hydrogen sulfide (that is, carbon dioxide and nitrogen) pass through the second adsorbent and are subsequently collected via second byproduct stream 438. During the regeneration cycle, components of second regeneration gas stream 446 (that is, nitrogen) enter one or more second stage adsorption vessels 455, 456, 457 to regenerate the second adsorbent. Desorption occurs in one or more second stage adsorption vessels 455, 456, 457, where the second adsorbent releases the captured hydrogen sulfide (and optionally trace quantities of carbon dioxide and nitrogen) to produce second outlet gas stream 440. Second outlet gas stream 440 includes hydrogen sulfide, nitrogen, and optionally trace quantities of carbon dioxide.

As shown in FIGS. 4A and B, second stage adsorption vessel 455 is undergoing the adsorption cycle, second stage adsorption vessel 456 is undergoing the regeneration cycle, and second stage adsorption vessel 457 is in standby mode. During the adsorption cycle, components of first outlet gas stream 432 are introduced through second stage adsorption vessel 455. Hydrogen sulfide is captured in the pores of the second adsorbent. In some embodiments, trace quantities of carbon dioxide and nitrogen can be captured in the pores of the second adsorbent. Components other than hydrogen sulfide (that is, carbon dioxide and nitrogen) pass through the second adsorbent to produce second byproduct stream 438 substantially in the absence of hydrogen sulfide. During the regeneration cycle, components of second regeneration gas stream 446 (that is, nitrogen) enter second stage adsorption vessel 456 to regenerate the second adsorbent. Desorption occurs in second stage adsorption vessel 456, where the second adsorbent releases the captured hydrogen sulfide (and optionally trace quantities of carbon dioxide and nitrogen) which can be collected via second outlet gas stream 440.

Second outlet gas stream 440 includes hydrogen sulfide and nitrogen. Second outlet gas stream 440 has a hydrogen sulfide content ranging between about 0 wt. % and about 99 wt. %, alternately between about 5 wt. % and about 70 wt. %, alternately between about 5 wt. % and about 50 wt. %, alternately between about 5 wt. % and about 30 wt. %, and alternately between about 10 wt. % and about 20 wt. %. In at least one embodiment, second outlet gas stream 440 has a hydrogen sulfide content of about 13.3 wt. %. Second outlet gas stream 440 has a nitrogen content ranging between about 0 wt. % and about 99 wt. %, alternately between about 20 wt. % and about 95 wt. %, alternately between about 30 wt. % and about 90 wt. %, alternately between about 50 wt. % and about 80 wt. %, and alternately between about 50 wt. % and about 70 wt. %. In at least one embodiment, second outlet gas stream 440 has a nitrogen content of about 80 wt. %. In some embodiments, second outlet gas stream 440 can be used as a feed gas for the Claus unit. As shown in FIGS. 4A and B, second outlet gas stream 440 can be introduced to reaction furnace 464 of the Claus unit.

Figure 5A:
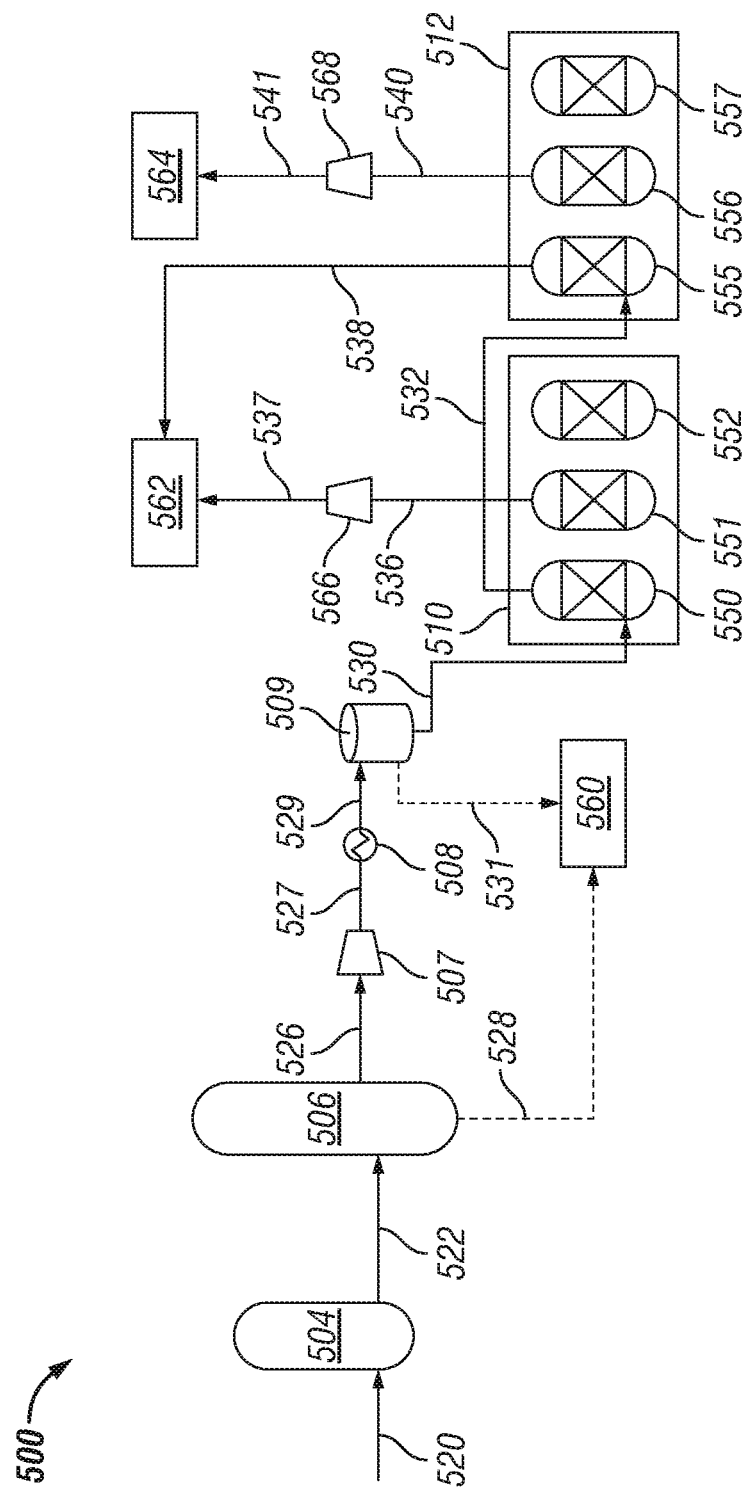
FIGS. 5A and B are schematic diagrams of a process for Claus tail gas treatment according to an embodiment of the disclosure.

FIGS. 5A and B show schematic diagrams of process 500 for an embodiment of the Claus tail gas treatment system. Process 500 can include hydrogenation reactor 504, quench tower 506, compressor 507, heat exchanger 508, collection drum 509, first stage adsorption unit 510, second stage adsorption unit 512, vacuum pump 566, and vacuum pump 568.

In one embodiment, as shown in FIG. 5A, tail gas stream 520 is introduced to hydrogenation reactor 504 to produce hydrogenated gas stream 522. Hydrogenated gas stream 522 is introduced to quench tower 506 to produce quenched gas stream 526 and first water condensate stream 528. Quenched gas stream 526 is pressurized by compressor 507 to produce quenched gas stream 527. Quenched gas stream 527 is cooled by heat exchanger 508 to produce quenched gas stream 529. Quenched gas stream 529 is introduced to collection drum 509 to produce second water condensate stream 531 and adsorption feed stream 530. First water condensate stream 528 and second water condensate stream 531 can be introduced to sour water stripper 560 for further processing. Adsorption feed stream 530 is introduced to first stage adsorption vessel 550 of first stage adsorption unit 510 to produce first outlet gas stream 532. First outlet gas stream 532 is introduced to second stage adsorption vessel 555 of second stage adsorption unit 512 to produce second byproduct stream 538. First byproduct streams 536, 537 are produced by operating vacuum pump 566 to desorb previously adsorbed components in first stage adsorption vessel 551 of first stage adsorption unit 510. Second byproduct stream 538 and first byproduct stream 537 can be introduced to thermal oxidizer 562 for further processing. Second outlet gas streams 540, 541 are produced by operating vacuum pump 568 to desorb previously adsorbed components in second stage adsorption vessel 556 of second stage adsorption unit 512. Second outlet gas stream 541 can be introduced to reaction furnace 564 of a Claus unit for further processing.

Figure 5B:
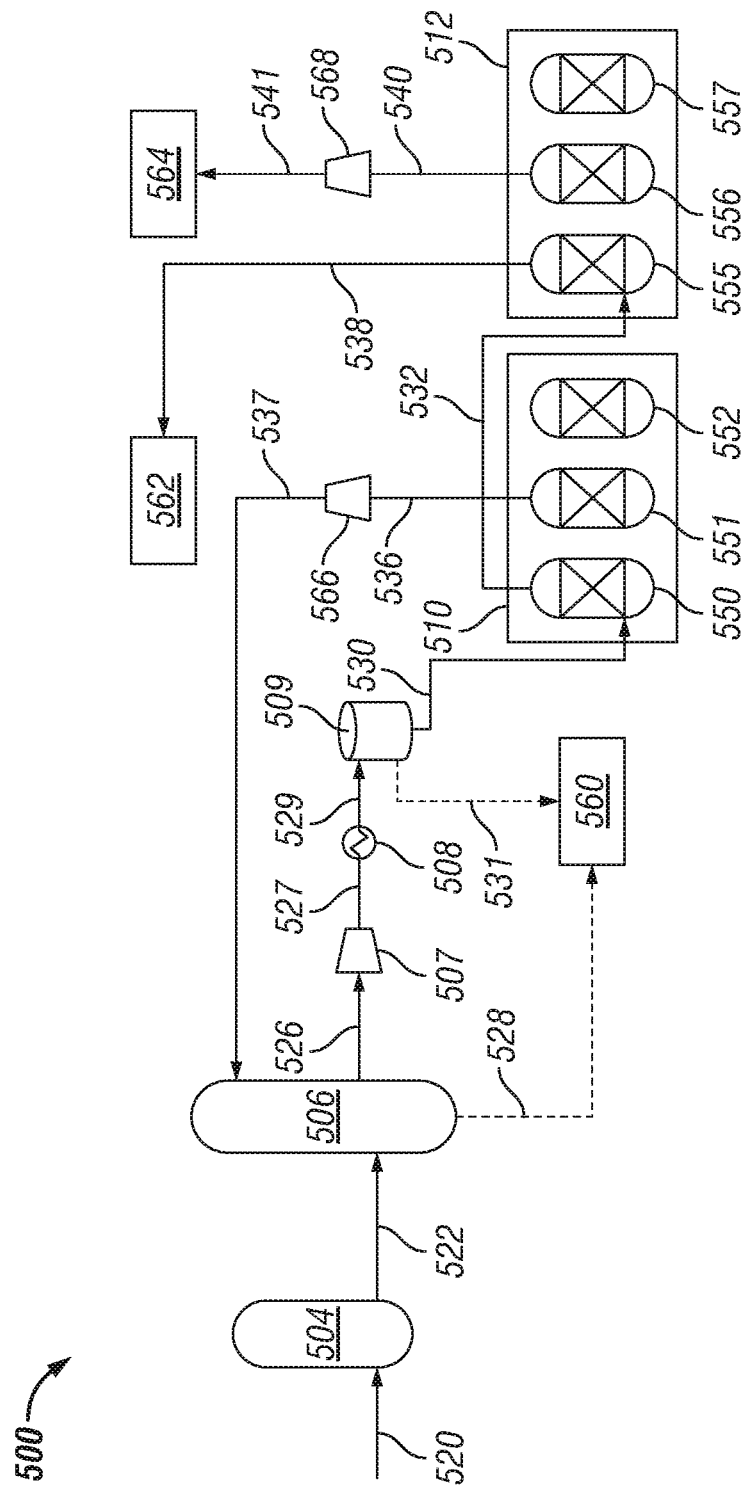

In an alternate embodiment, as shown in FIG. 5B, tail gas stream 520 is introduced to hydrogenation reactor 504 to produce hydrogenated gas stream 522. Hydrogenated gas stream 522 is introduced to quench tower 506 to produce quenched gas stream 526 and first water condensate stream 528. Quenched gas stream 526 is pressurized by compressor 507 to produce quenched gas stream 5227. Quenched gas stream 527 is cooled by heat exchanger 508 to produce quenched gas stream 529. Quenched gas stream 529 is introduced to collection drum 509 to produce second water condensate stream 531 and adsorption feed stream 530. First water condensate stream 528 and second water condensate stream 531 can be introduced to sour water stripper 560 for further processing. Adsorption feed stream 530 is introduced to first stage adsorption vessel 550 of first stage adsorption unit 510 to produce first outlet gas stream 532. First outlet gas stream 532 is introduced to second stage adsorption vessel 555 of second stage adsorption unit 512 to produce second byproduct stream 538. Second byproduct stream 538 can be introduced to thermal oxidizer 562 for further processing. First byproduct streams 536, 537 are produced by operating vacuum pump 566 to desorb previously adsorbed components in first stage adsorption vessel 551 of first stage adsorption unit 510. First byproduct stream 537 is introduced to quench tower 506. Second outlet gas streams 540, 541 are produced by operating vacuum pump 568 to desorb previously adsorbed components in second stage adsorption vessel 556 of second stage adsorption unit 512. Second outlet gas stream 541 can be introduced to reaction furnace 564 of a Claus unit for further processing.

Tail gas stream 520 includes a Claus tail gas. The Claus tail gas includes sulfur-containing compounds that were not fully recovered by the Claus unit. The sulfur-containing compounds can exist in forms such as elemental sulfur, hydrogen sulfide, sulfur oxides, and anionic counterparts of the same. Non-limiting example sulfur oxides include $SO$, $SO_2$, $SO_3$, $SO_4$, $S_2O$, $S_2O_2$, $S_6O$, $S_6O_2$, $S_7O$, $S_7O_2$, $S_8O$, $S_9O$, and $S_{10}O$. The Claus tail gas can also include carbon dioxide, water, nitrogen, hydrogen, and combinations of the same.

Optionally, tail gas stream 520 can be preheated to a temperature at which hydrogenation reactions can occur in hydrogenation reactor 504. Tail gas stream 520 can be preheated to a temperature between about 200° C. and about 300° C., alternately between about 520° C. and about 280° C., and alternately between about 240° C. and about 260° C. In at least one embodiment, tail gas stream 520 can be preheated to a temperature of about 250° C.

Hydrogenation reactor 504 can be any reactor, catalytic or non-catalytic, capable of reducing the sulfur-containing compounds other than hydrogen sulfide to hydrogen sulfide. Optionally, hydrogen included in tail gas stream 520 can be used for reducing the sulfur-containing compounds to hydrogen sulfide. Optionally, a make-up hydrogen gas stream (not shown) can be introduced to hydrogenation reactor 504. Optionally, water can be produced as a byproduct during the hydrogenation reaction. As a result, hydrogenated gas stream 522 includes sulfur-containing compounds of substantially hydrogen sulfide only. Hydrogenated gas stream 522 can also include carbon dioxide, water, nitrogen, and combinations of the same. Hydrogenated gas stream 522 has a temperature between about 20° C. and about 300° C., alternately between about 20° C. and about 170° C., alternately between about 30° C. and about 100° C., or alternately between about 40° C. and about 80° C. In at least one embodiment, the temperature of hydrogenated gas stream 522 is about 43° C.

Quench tower 506 can be any apparatus capable of condensing and recovering water. A significant portion of water included in hydrogenated gas stream 524 is condensed and substantially recovered via first water condensate stream 528. Although a significant portion of water included in hydrogenated gas stream 524 is removed, the resulting quenched gas stream 526 can still include residual amounts of gas phase water. Quenched gas stream 526 has a gas phase water content ranging between about 0 mol % and about 20 mol %, alternately between about 3 mol % and about 15 mol %, or alternately between about 4 mol % and about 10 mol %. In at least one embodiment, the gas phase water content of quenched gas stream 526 is about 8 mol %. Quenched gas stream 526 can also include hydrogen sulfide (that is, the hydrogen sulfide preexisting in the Claus tail gas or produced in hydrogenation reactor 504, or both), carbon dioxide, nitrogen, and combinations of the same. Quenched gas stream 526 has a temperature ranging between about 20° C. and about 170° C., alternately between about 30° C. and about 100° C., or alternately between about 40° C. and about 80° C. In at least one embodiment, the temperature of quenched gas stream 526 is about 43° C.

Compressor 507 can be any type of pressurizing device or apparatus capable of increasing the pressure of quenched gas stream 526. In at least one embodiment, compressor 507 is a diaphragm metering pump. The pressure of quenched gas stream 526 is increased via compressor 507 such that quenched gas stream 527 has a pressure ranging between about 1 bar and about 10 bar, alternately between about 1 bar and about 5 bar, or alternately between about 2 bar and about 4 bar. In at least one embodiment, the pressure of quenched gas stream 527 is about 3 bar.

Heat exchanger 508 can be any heat exchanger capable of cooling a gas stream to a temperature at which adsorption occurs in first stage adsorption unit 510. Heat exchanger 208 can cool quenched gas stream 527 such that quenched gas stream 529 has a temperature ranging between about 0° C. and about 50° C., alternately between about 5° C. and about 40° C., and alternately between about 10° C. and about 30° C. In at least one embodiment, the temperature of quenched gas stream 529 is about 15° C. As quenched gas stream 527 is cooled, the gas phase water content of quenched gas stream 529 reduces to a range between about 0 mol % and about 10 mol %, alternately between about 0 mol % and about 5 mol %, or alternately between about 0 mol % and about 1 mol %. In at least one embodiment, the gas phase water content of quenched gas stream 529 is about 0.46 mol %. Quenched gas stream 529 can include hydrogen sulfide (that is, the hydrogen sulfide preexisting in the Claus tail gas or produced in hydrogenation reactor 504, or both), carbon dioxide, water, nitrogen, and combinations of the same.

Collection drum 509 can be any type of separation device capable of separating a fluid stream into a gas phase stream and a liquid phase stream. Quenched gas stream 529 is separated in collection drum 509 to produce second water condensate stream 531 (a liquid phase stream) and adsorption feed stream 530 (a gas phase stream). Adsorption feed stream 530 can include hydrogen sulfide (that is, the hydrogen sulfide preexisting in the Claus tail gas or produced in hydrogenation reactor 504, or both), carbon dioxide, water, nitrogen, and combinations of the same.

In some embodiments, first water condensate stream 528 can include trace quantities of hydrogen sulfide dissolved in water collected from quench tower 506. In some embodiments, second water condensate stream 531 can include trace quantities of hydrogen sulfide dissolved in water collected from collection drum 509. Each of first water condensate stream 528 and second water condensate stream 531 can be introduced to sour water stripper 560 for further processing such as stripping hydrogen sulfide from water.

First stage adsorption unit 510 includes first stage adsorption vessels 550, 551, 552 fluidly connected in a parallel manner. At any given moment during operation, one of first stage adsorption vessels 550, 551, 552 is undergoing an adsorption cycle, one of first stage adsorption vessels 550, 551, 552 is undergoing a regeneration cycle, and one of first stage adsorption vessels 550, 551, 552 is standing by. In this manner, components of adsorption feed stream 530 can be continuously fed to first stage adsorption unit 510 and a continuous flow of first outlet gas stream 532 and first byproduct stream 536 can be produced from first stage adsorption unit 510.

Each of first stage adsorption vessels 550, 551, 552 is filled with a first adsorbent. The first adsorbent can include any adsorbent capable of selectively capturing water from a wet gas stream (such as adsorption feed stream 530) while rejecting hydrogen sulfide, carbon dioxide, and nitrogen. Non-limiting example materials used for the first adsorbent include hydrophilic 3 Å molecular sieves as shown for example in U.S. Pat. Pub. No. 2017/0190574, which is incorporated in this disclosure by reference in its entirety. During the adsorption cycle, components of adsorption feed stream 530 are introduced through one of first stage adsorption vessels 550, 551, 552. Water is captured in the pores of the first adsorbent. Components other than water (that is, hydrogen sulfide, carbon dioxide, and nitrogen) pass through the first adsorbent to produce first outlet gas stream 532 substantially in the absence of water. During the regeneration cycle, vacuum is applied to one of first stage adsorption vessels 550, 551, 552 to regenerate the first adsorbent. Desorption occurs in one of first stage adsorption vessels 550, 551, 552, where the first adsorbent releases the captured water (and optionally trace quantities of carbon dioxide and nitrogen) which can be collected via first byproduct stream 536.

As shown in FIGS. 5A and B, first stage adsorption vessel 550 is undergoing the adsorption cycle, first stage adsorption vessel 551 is undergoing the regeneration cycle, and first stage adsorption vessel 552 is in standby mode. During the adsorption cycle, components of adsorption feed stream 530 are introduced through first stage adsorption vessel 550. Water is captured in the pores of the first adsorbent. In some embodiments, trace quantities of carbon dioxide and nitrogen can be captured in the pores of the first adsorbent. Components other than water (that is, hydrogen sulfide, carbon dioxide, and nitrogen) pass through the first adsorbent to produce first outlet gas stream 532 substantially in the absence of water. During the regeneration cycle, vacuum is applied to first stage adsorption vessel 551 to regenerate the first adsorbent. Desorption occurs in first stage adsorption vessel 551, where the first adsorbent releases the captured water (and optionally trace quantities of carbon dioxide and nitrogen) which can be collected via first byproduct stream 536.

Vacuum pump 566 can be any type of device or apparatus capable of generating vacuum. Vacuum is applied to first stage adsorption vessel 551 where the first adsorbent is regenerated to produce first byproduct streams 536, 537.

In some embodiments, trace quantities of hydrogen sulfide can be captured in the pores of the first adsorbent. Upon regeneration, first byproduct stream 537 can be introduced to thermal oxidizer 562 for further processing, as shown in FIG. 5A, if the concentration of hydrogen sulfide in first byproduct stream 537 is less than about 10 ppm. Alternately, upon regeneration, first byproduct stream 537 can be introduced to quench tower 506, as shown in FIG. 5B, if the concentration of hydrogen sulfide in first byproduct stream 537 is greater than about 10 ppm.

Second stage adsorption unit 512 includes second stage adsorption vessels 555, 556, 557 fluidly connected in a parallel manner. At any given moment during operation, one of second stage adsorption vessels 555, 556, 557 is undergoing an adsorption cycle, one of second stage adsorption vessels 555, 556, 557 is undergoing a regeneration cycle, and one of second stage adsorption vessels 555, 556, 557 is standing by. In this manner, components of first outlet gas stream 532 can be continuously fed to second stage adsorption unit 512 and a continuous flow of second outlet gas stream 540 and second byproduct stream 538 can be produced from second stage adsorption unit 512.

Each of second stage adsorption vessels 555, 556, 557 is filled with a second adsorbent. In some embodiments, the second adsorbent can include any adsorbent capable of selectively capturing hydrogen sulfide while rejecting carbon dioxide and nitrogen. In other embodiments, the second adsorbent can include any adsorbent having differences in breakthrough time between hydrogen sulfide and carbon dioxide, and between hydrogen sulfide and nitrogen. Non-limiting example materials used for the second adsorbent include hydrophobic zeolites having a framework such as an MFI type, a CHA type, an FAU type, an MOR type, a DDR type, an FER type, and an MWW type. Non-limiting example materials used for the second adsorbent also include hydrophobic zeolites such as MOFs and ZIFs. In at least one embodiment, the second adsorbent includes a Cu-Y type zeolite, which is a derivative of an FAU type zeolite including copper cations as counterions. During the adsorption cycle, components of first outlet gas stream 532 are introduced through one or more second stage adsorption vessels 555, 556, 557. Hydrogen sulfide is captured in the pores of the second adsorbent. Components other than hydrogen sulfide (that is, carbon dioxide and nitrogen) pass through the second adsorbent and are subsequently collected via second byproduct stream 538. During the regeneration cycle, vacuum is applied to one or more second stage adsorption vessels 555, 556, 557 to regenerate the second adsorbent. Desorption occurs in one or more second stage adsorption vessels 555, 556, 557, where the second adsorbent releases the captured hydrogen sulfide (and optionally trace quantities of carbon dioxide and nitrogen) to produce second outlet gas stream 540. Second outlet gas stream 540 includes hydrogen sulfide and optionally trace quantities of carbon dioxide and nitrogen.

As shown in FIGS. 5A and B, second stage adsorption vessel 555 is undergoing the adsorption cycle, second stage adsorption vessel 556 is undergoing the regeneration cycle, and second stage adsorption vessel 557 is in standby mode. During the adsorption cycle, components of first outlet gas stream 532 are introduced through second stage adsorption vessel 555. Hydrogen sulfide is captured in the pores of the second adsorbent. In some embodiments, trace quantities of carbon dioxide and nitrogen can be captured in the pores of the second adsorbent. Components other than hydrogen sulfide (that is, carbon dioxide and nitrogen) pass through the second adsorbent to produce second byproduct stream 538 substantially in the absence of hydrogen sulfide. During the regeneration cycle, vacuum is applied to second stage adsorption vessel 556 to regenerate the second adsorbent. Desorption occurs in second stage adsorption vessel 556, where the second adsorbent releases the captured hydrogen sulfide (and optionally trace quantities of carbon dioxide and nitrogen) which can be collected via second outlet gas stream 540.

Vacuum pump 568 can be any type of device or apparatus capable of generating vacuum. Vacuum is applied to second stage adsorption vessel 556 where the second adsorbent is regenerated to produce second outlet gas streams 540, 541.

Second outlet gas stream 541 includes hydrogen sulfide. Second outlet gas stream 541 has a hydrogen sulfide content of at least about 95 wt. %, alternately at least about 98 wt. %, and alternately at least about 99 wt. %. In some embodiments, second outlet gas stream 541 can be used as a feed gas for the Claus unit. As shown in FIGS. 5A and B, second outlet gas stream 541 can be introduced to reaction furnace 564 of the Claus unit.

EXAMPLES

The disclosure is illustrated by the following examples, which are presented for illustrative purposes only, and are not intended as limiting the scope of the invention which is define by the appended claims.

Example 1

A grand canonical Monte Carlo (GCMC) simulation was conducted to determine the adsorption of 1 mol % hydrogen sulfide using a Cu-Y type zeolite as the second adsorbent for the second stage adsorption unit. Six million Monte Carlo iterations were performed to reach equilibrium and statistical averages were subsequently determined. It was assumed that no chemical interactions took place. It was also assumed that gaseous components other than hydrogen sulfide were not competing for adsorption. Temperature was set at 25° C. The adsorption capacity of the Cu-Y type zeolite with respect to hydrogen sulfide was calculated. The results are plotted in FIG. 6.

Figure 6:
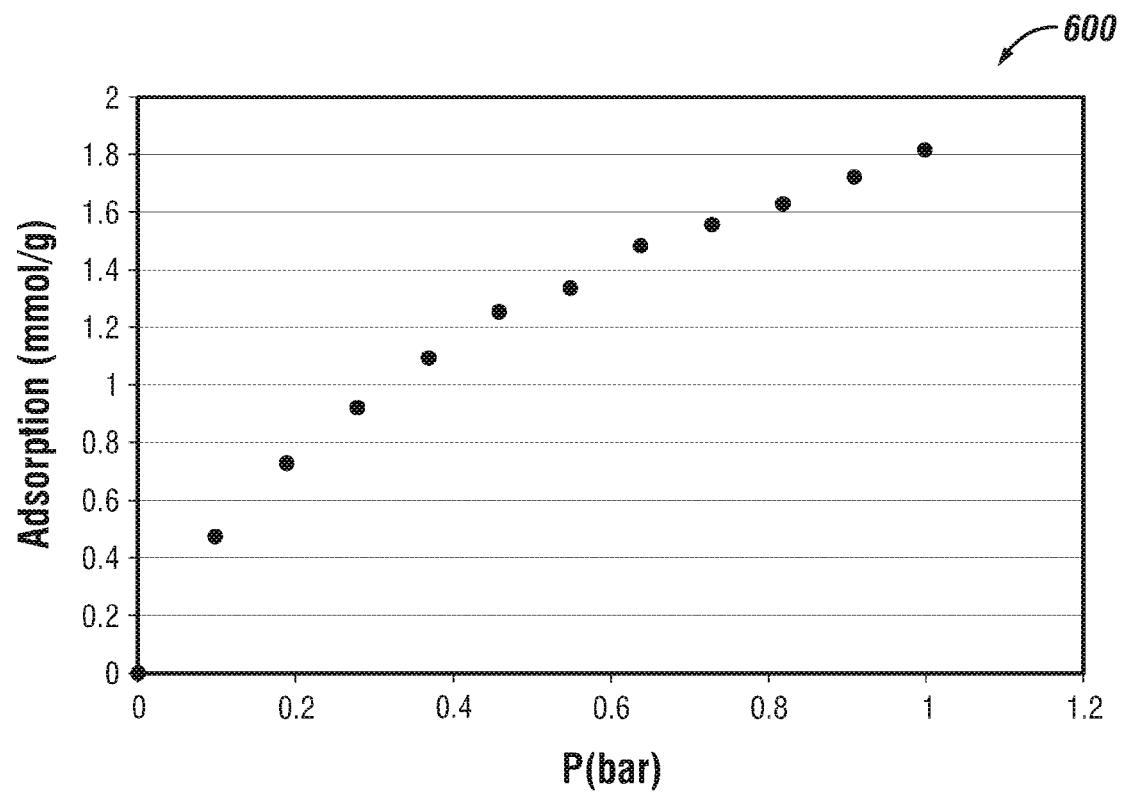
FIG. 6 is a graphical representation showing an adsorption isotherm of hydrogen sulfide using an adsorbent according to an embodiment of the disclosure.

FIG. 6 is a graphical representation 600 showing an adsorption isotherm of hydrogen sulfide using the Cu-Y type zeolite at 25° C. The horizontal axis partial pressure of gaseous components expressed in bar. The vertical axis represents the adsorption capacity of the Cu-Y type zeolite expressed in millimoles per gram (mmol/g).

The results depicted in FIG. 6 show that the Cu-Y type zeolite can capture hydrogen sulfide and therefore is a suitable material used as the second adsorbent for the second stage adsorption unit.

Example 2

An ultra-lean gas plant with co-firing, a three-stage Claus unit, and a Claus tail gas treatment system having a configuration similar to FIGS. 2A and B were modelled using the HYSYS Hydroprocessing Model (Aspen Technology, Inc., Bedford, Massachusetts). In reference to the properties of the streams for Example 2, the description and stream numbers for FIGS. 2A and B are used.

The ultra-lean gas plant produced a Claus feed gas stream including 20 mol % hydrogen sulfide at 50 million standard cubic feet per day (MMSCFD). The three stage Claus unit produced a Claus tail gas (stream 220). The Claus tail gas was introduced to a hydrogenation reactor (unit 204) to produce a hydrogenated gas stream (stream 222). The hydrogenated gas stream was introduced to a quench tower (unit 206) to produce a quenched gas stream (stream 226). The quenched gas stream was pressurized (stream 227) via a compressor (unit 207). The quenched gas stream was further cooled (stream 229) via a heat exchanger (unit 208). The quenched gas stream was introduced to a gas-liquid separator (unit 209) to produce a liquid product (stream 231) and a gas product (stream 230). The gas product was introduced to a first stage adsorption vessel (unit 250) for water adsorption. The first stage adsorption vessel had a diameter of about 3.3 meters and a height of about 8.6 meters. The first stage adsorption vessel included a hydrophilic 3 Å molecular sieve as the first adsorbent. The adsorption cycle was conducted for about 24 hours. The first stage adsorption vessel produced an outlet gas stream (stream 232). The outlet gas stream was introduced to a second stage adsorption vessel (unit 255) for hydrogen sulfide adsorption. The second stage adsorption vessel had a diameter of about 4.63 meters and a height of about 12.1 meters. The second stage adsorption vessel included a Cu-Y type zeolite as the second adsorbent. The adsorption cycle was conducted for about 24 hours. The second stage adsorption vessel produced a byproduct gas stream (stream 238).

Properties and compositions of certain streams for Example 2 are provided in Table 1.

TABLE 1

|  | Claus Feed Gas Stream | Stream 222 | Stream 230 | Stream 232 | Stream 238 |
|---|---|---|---|---|---|
| Temperature (°C) | 43.3333 | 43.4444 | 15.5556 | 15.5556 | 15.5556 |
| Pressure (bar) | 0.8274 | 0.5516 | 2.9999 | 2.9999 | 0.5516 |
| Gas Flow (lbmol/hr) | | | | | |
| $CH_4$ | 54.9000 | – | – | – | – |
| $H_2O$ | 219.6000 | 988.1350 | 48.2565 | – | – |
| $H_2$ | – | 640.0550 | 640.1134 | 640.1134 | 640.1134 |
| Ar | – | 58.3950 | 58.4003 | 58.4003 | 58.4003 |
| $N_2$ | – | 4981.8950 | 4982.3244 | 4982.3244 | 4886.1984 |
| CO | – | 13.7400 | 13.7413 | 13.7413 | 13.7413 |
| $CO_2$ | 4117.5000 | 4703.6600 | 4703.0795 | 4703.0795 | 4382.6564 |
| $H_2S$ | 1098.0000 | 64.1200 | 64.0846 | 64.0846 | – |
| Total | 5490.0000 | 11450.0000 | 10510.0000 | 10461.7435 | 9981.1098 |
| Mole Percentage (mol %) | | | | | |
| $CH_4$ | 1.0000 | – | – | – | – |
| $H_2O$ | 4.0000 | 8.6300 | 0.4591 | – | – |
| $H_2$ | – | 5.5900 | 6.0905 | 6.1186 | 6.4132 |
| Ar | – | 0.5100 | 0.5557 | 0.5582 | 0.5851 |
| $N_2$ | – | 43.5100 | 47.4056 | 47.6242 | 48.9544 |
| CO | – | 0.1200 | 0.1307 | 0.1313 | 0.1377 |
| $CO_2$ | 75.0000 | 41.0800 | 44.7486 | 44.9550 | 43.9095 |

TABLE 1-continued

| | Claus Feed Gas Stream | Stream 222 | Stream 230 | Stream 232 | Stream 238 |
|---|---|---|---|---|---|
| $H_2S$ | 20.0000 | 0.5600 | 0.6097 | 0.6126 | — |
| Total | 100.0000 | 100.0000 | 100.0000 | 100.0000 | 100.0000 |

Example 3

Experiments were conducted to determine the adsorption of water using a hydrophilic 3 Å molecular sieve as the first adsorbent for the first stage adsorption unit. The experimental setup included a dynamic adsorption unit. The dynamic adsorption unit included an adsorption bed of hydrophilic 3 Å molecular sieves with a heating element placed adjacent to the adsorption bed. The dynamic adsorption unit had a diameter of about 3.3 meters and a height of about 8.6 meters. A continuous gas flow was introduced to the dynamic adsorption unit. The gas flow had properties and a composition similar to those of stream 230 as shown in Table 1. The effluent gas was analyzed by gas chromatography (GC) to determine mole concentrations of hydrogen sulfide, carbon dioxide, and nitrogen over time. The results are plotted in FIG. 7.

Figure 7:
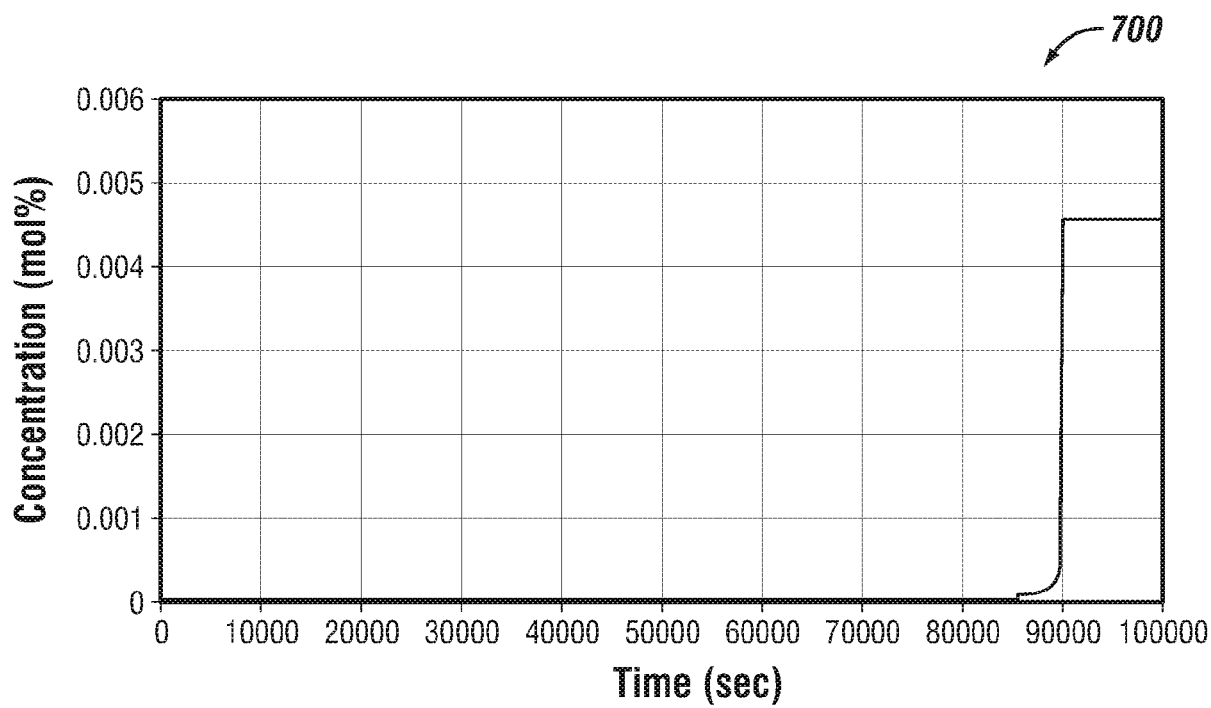
FIG. 7 is a graphical representation showing a breakthrough curve of water included in a gas mixture using an adsorbent according to an embodiment of the disclosure.

FIG. 7 is a graphical representation 700 showing a breakthrough curve of water included in the gas mixture using the hydrophilic 3 Å molecular sieve. The horizontal axis represents time in seconds. The vertical axis represents the concentration of water in mol %.

As shown in FIG. 7, the breakthrough time (corresponding to the threshold time of the breakthrough curve) of water was greater than about 85,000 seconds. As used throughout the disclosure, the term "breakthrough time" of a certain gaseous component refers to the amount of time elapsed until the gaseous component is detected by GC. In the beginning of the experiment, the gaseous component is not detectable by GC because it is adsorbed by the adsorbent. Once the adsorption capacity of the adsorbent reaches its maximum, the adsorbent becomes saturated. Accordingly, beyond the breakthrough time, the gaseous component does not undergo further adsorption and becomes detectable by GC.

The results depicted in FIG. 7 and Table 1 show that the hydrophilic 3 Å molecular sieve effectively captures water during the course of the 24 hour adsorption cycle while rejecting hydrogen sulfide, carbon dioxide, and nitrogen, and therefore is a suitable material used as the first adsorbent for the first stage adsorption unit.

Example 4

Experiments were conducted to determine the adsorption of hydrogen sulfide, carbon dioxide, and nitrogen using a Cu-Y type zeolite as the second adsorbent for the second stage adsorption unit. The experimental setup included a dynamic adsorption unit. The dynamic adsorption unit included an adsorption bed of Cu-Y type zeolite with a heating element placed adjacent to the adsorption bed. The dynamic adsorption unit had a diameter of about 4.63 meters and a height of about 12.1 meters. A continuous gas flow was introduced to the dynamic adsorption unit. The gas flow had properties and a composition similar to those of stream 232 as shown in Table 1. The effluent gas was analyzed by GC to determine mole concentrations of carbon dioxide and nitrogen over time. The results are plotted in FIGS. 8 and 9.

Figure 8:
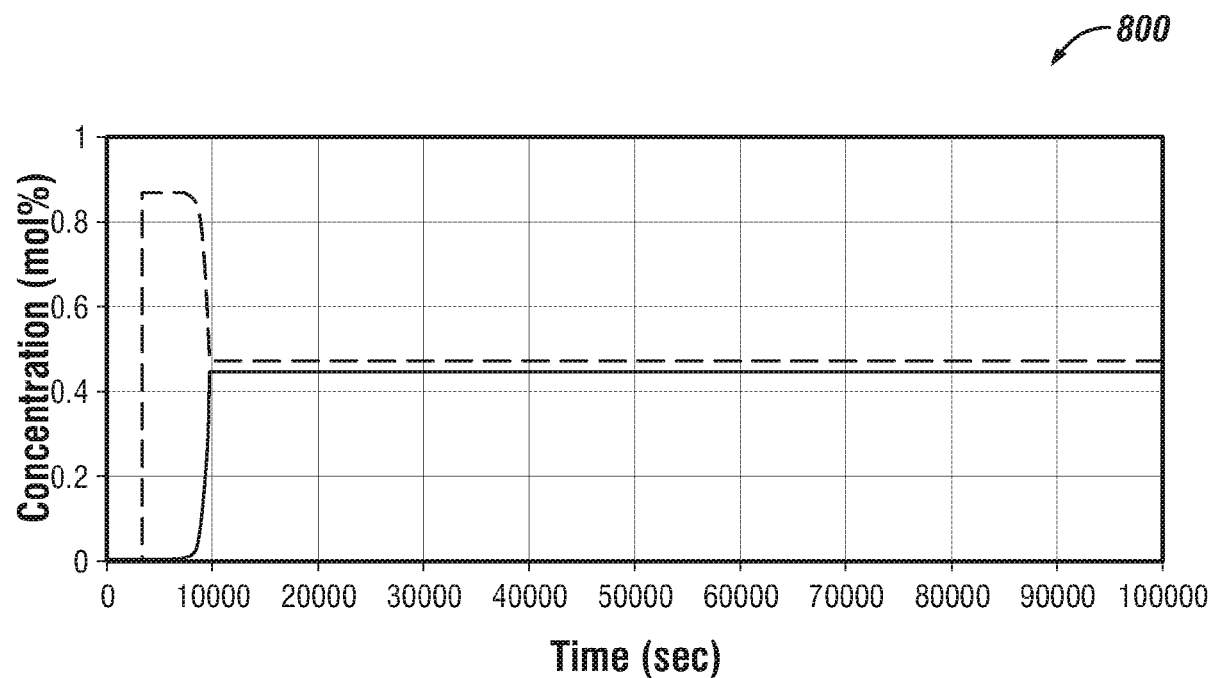
FIG. 8 is a graphical representation showing breakthrough curves of carbon dioxide and nitrogen included in a gas mixture using an adsorbent according to an embodiment of the disclosure.

FIG. 8 is a graphical representation 800 showing breakthrough curves of carbon dioxide and nitrogen included in the gas mixture using the Cu-Y type zeolite. The horizontal axis represents time in seconds. The vertical axis represents the concentration of carbon dioxide and nitrogen in mol %. The solid line represents carbon dioxide. The dashed line represents nitrogen.

As shown in FIG. 8, the breakthrough times (corresponding to the threshold times of the breakthrough curves) of carbon dioxide (less than about 10,000 seconds) and nitrogen (less than about 5,000 seconds) are significantly less than the 24 hour adsorption cycle.

Figure 9:
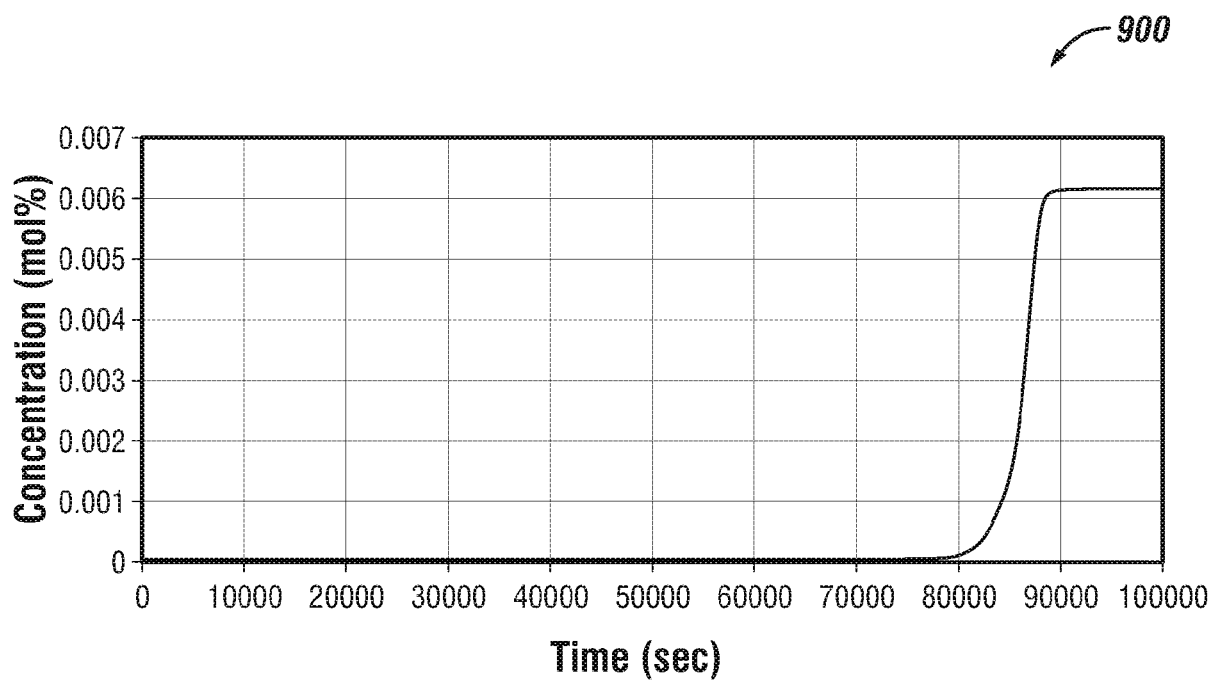
FIG. 9 is a graphical representation showing a breakthrough curve of hydrogen sulfide included in a gas mixture using an adsorbent according to an embodiment of the disclosure.

FIG. 9 is a graphical representation 900 showing a breakthrough curve of hydrogen sulfide included in the gas mixture using the Cu-Y type zeolite. The horizontal axis represents time in seconds. The vertical axis represents the concentration of hydrogen sulfide in mol %.

As shown in FIG. 9, the breakthrough time (corresponding to the threshold time of the breakthrough curve) of hydrogen sulfide was about 80,000 seconds.

The results depicted in FIGS. 8 and 9, and Table 1 show that the Cu-Y type zeolite effectively captures hydrogen sulfide during the course of the 24 hour adsorption cycle while minimally capturing carbon dioxide and nitrogen, and therefore is a suitable material used as the second adsorbent for the second stage adsorption unit. In addition, the results show that the byproduct stream (stream 238) is suitable for use as a regeneration gas during a regeneration cycle of each of the first stage adsorption vessel and the second stage adsorption vessel.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for sulfur recovery, the method comprising the steps of:

feeding a tail gas stream to a hydrogenation reactor to produce a hydrogenated gas stream by converting sulfur-containing compounds to hydrogen sulfide, wherein the tail gas stream includes a Claus tail gas comprising the sulfur-containing compounds, wherein the hydrogenated gas stream comprises hydrogen sulfide, water, and at least one of: carbon dioxide and nitrogen, wherein the hydrogenated gas stream is in the absence of the sulfur-containing compounds other than hydrogen sulfide;

feeding the hydrogenated gas stream to a quench tower to produce a quenched gas stream by condensing and recovering liquid water via a first water condensate stream, wherein the quenched gas stream comprises hydrogen sulfide and at least one of: water, carbon dioxide, and nitrogen;

feeding the quenched gas stream to a first stage adsorption vessel of a first stage adsorption unit to produce a first outlet gas stream by adsorbing water, wherein the first outlet gas stream comprises hydrogen sulfide and at least one of: carbon dioxide and nitrogen, wherein the first outlet gas stream is in the absence of water;

feeding the first outlet gas stream to a second stage adsorption vessel of a second stage adsorption unit to produce a second byproduct gas stream by adsorbing hydrogen sulfide, wherein the second byproduct gas stream is in the absence of hydrogen sulfide;

regenerating the first stage adsorption vessel to produce a first byproduct gas stream by desorbing water, wherein the first byproduct gas stream comprises water; and regenerating the second stage adsorption vessel to produce a second outlet gas stream, wherein the second outlet gas stream comprises hydrogen sulfide.

2. The method of claim 1, further comprising the step of:
cooling the hydrogenated gas stream to a temperature ranging between 40° C. and 80° C.

3. The method of claim 1, further comprising the steps of:
pressurizing the quenched gas stream to a pressure ranging between 2 bar and 4 bar; and
cooling the quenched gas stream to a temperature ranging between 10° C. and 30° C.

4. The method of claim 3, further comprising the step of:
feeding the quenched gas stream to a collection drum to produce an adsorption feed stream by recovering liquid water via a second water condensate stream, wherein the adsorption feed stream is fed to the first stage adsorption vessel.

5. The method of claim 1, wherein the first stage adsorption unit comprises at least three first stage adsorption vessels fluidly connected in parallel such that continuous flows of the first outlet gas stream and the first byproduct gas stream are provided by having one of the at least three first stage adsorption vessels in an adsorption cycle, one of the at least three first stage adsorption vessels in a regeneration cycle, and one of the at least three first stage adsorption vessels in a standby cycle.

6. The method of claim 1, wherein the first stage adsorption vessel comprises a first adsorbent, wherein the first adsorbent adsorbs water while passes hydrogen sulfide, carbon dioxide, and nitrogen to form the first outlet gas stream during an adsorption cycle.

7. The method of claim 6, wherein the first adsorbent comprises a hydrophilic 3 Å molecular sieve.

8. The method of claim 1, wherein the second stage adsorption unit comprises at least three second stage adsorption vessels fluidly connected in parallel such that continuous flows of the second outlet gas stream and the second byproduct gas stream are provided by having one of the at least three second stage adsorption vessels in an adsorption cycle, one of the at least three second stage adsorption vessels in a regeneration cycle, and one of the at least three second stage adsorption vessels in a standby cycle.

9. The method of claim 1, wherein the second stage adsorption vessel comprises a second adsorbent, wherein the second adsorbent adsorbs hydrogen sulfide while passes carbon dioxide and nitrogen to form the second byproduct stream during an adsorption cycle.

10. The method of claim 9, wherein the second adsorbent comprises a Cu-Y type zeolite.

11. The method of claim 1, further comprising the step of:
feeding the first byproduct gas stream to the quench tower.

12. The method of claim 1, wherein the regenerating the first stage adsorption vessel step includes feeding a portion of the second byproduct gas stream to the first stage adsorption vessel.

13. The method of claim 1, wherein the regenerating the first stage adsorption vessel step includes feeding nitrogen gas to the first stage adsorption vessel.

14. The method of claim 1, wherein the regenerating the first stage adsorption vessel step includes applying vacuum to the first stage adsorption vessel.

15. The method of claim 1, wherein the regenerating the second stage adsorption vessel step includes feeding a portion of the second byproduct gas stream to the second stage adsorption vessel.

16. The method of claim 1, wherein the regenerating the second stage adsorption vessel step includes feeding a sales gas to the second stage adsorption vessel.

17. The method of claim 1, wherein the regenerating the second stage adsorption vessel step includes feeding nitrogen gas to the second stage adsorption vessel.

18. The method of claim 1, wherein the regenerating the second stage adsorption vessel step includes applying vacuum to the second stage adsorption vessel.

19. A Claus tail gas treatment system for sulfur recovery, the Claus tail gas treatment system comprising:
a hydrogenation reactor, the hydrogenation reactor configured to receive a Claus tail gas and to convert sulfur-containing compounds to hydrogen sulfide such that a hydrogenated gas stream is produced, wherein the Claus tail gas comprises the sulfur-containing compounds, wherein the hydrogenated gas stream comprises hydrogen sulfide, water, and at least one of: carbon dioxide and nitrogen, wherein the hydrogenated gas stream is in the absence of the sulfur-containing compounds other than hydrogen sulfide;
a quench tower, the quench tower fluidly connected downstream of the hydrogenation reactor to receive the hydrogenated gas stream, the quench tower configured to condense and recover liquid water via a first water condensate stream and to produce a quenched gas stream, wherein the quenched gas stream comprises hydrogen sulfide and at least one of: water, carbon dioxide, and nitrogen;
a first stage adsorption unit, the first stage adsorption unit comprising at least three first stage adsorption vessels fluidly connected in parallel, wherein, during a first stage adsorption cycle, one of the at least three first stage adsorption vessels is fluidly connected downstream of the quench tower to receive the quenched gas stream and adsorb water to produce a first outlet gas stream, wherein, during a first stage regeneration cycle, one of the at least three first stage adsorption vessels desorbs water to produce a first byproduct gas stream, wherein the first outlet gas stream comprises hydrogen sulfide and at least one of: carbon dioxide and nitrogen, wherein the first outlet gas stream is in the absence of water, wherein the first byproduct gas stream comprises water; and
a second stage adsorption unit, the second stage adsorption unit comprising at least three second stage adsorption vessels fluidly connected in parallel, wherein, during a second stage adsorption cycle, one of the at least three second stage adsorption vessels is fluidly connected downstream of first stage adsorption unit to receive the first outlet gas stream and adsorb hydrogen sulfide to produce a second byproduct gas stream, wherein, during a second stage regeneration cycle, one of the at least three second stage adsorption vessels desorbs hydrogen sulfide to produce a second outlet gas stream, wherein the second byproduct gas stream is in the absence of hydrogen sulfide, wherein the second outlet gas stream comprises hydrogen sulfide.

20. The Claus tail gas treatment system of claim 19, further comprising:
a first heat exchanger, the first heat exchanger fluidly connected downstream of the hydrogenation reactor and upstream of the quench tower, the first heat exchanger configured to cool the hydrogenated gas stream to a temperature ranging between 40° C. and 80° C.

21. The Claus tail gas treatment system of claim 19, further comprising:
a compressor, the compressor fluidly connected downstream of the quench tower, the compressor configured to pressurize the quenched gas stream to a pressure ranging between 2 bar and 4 bar;
a second heat exchanger, the second heat exchanger fluidly connected downstream of the quench tower, the second heat exchanger configured to cool the quenched gas stream to a temperature ranging between 10° C. and 30° C.; and
a collection drum, the collection drum fluidly connected downstream of the compressor and the second heat exchanger and upstream of the first stage adsorption unit, the collection drum configured to produce an adsorption feed stream by recovering liquid water from the quenched gas stream via a second water condensate stream, wherein the adsorption feed stream is introduced to the first stage adsorption unit.

22. The Claus tail gas treatment system of claim 19, wherein the first stage adsorption vessel comprises a first adsorbent, wherein the first adsorbent is configured to adsorb water while passing hydrogen sulfide, carbon dioxide, and nitrogen to form the first outlet gas stream during the first stage adsorption cycle.

23. The Claus tail gas treatment system of claim 22, wherein the first adsorbent comprises a hydrophilic 3 Å molecular sieve.

24. The Claus tail gas treatment system of claim 19, wherein the second stage adsorption vessel comprises a second adsorbent, wherein the second adsorbent is configured to adsorb hydrogen sulfide while passing carbon dioxide and nitrogen to form the second byproduct stream during the second stage adsorption cycle.

25. The Claus tail gas treatment system of claim 24, wherein the second adsorbent comprises a Cu-Y type zeolite.

26. The Claus tail gas treatment system of claim 19, wherein the first byproduct gas stream is introduced to the quench tower.

27. The Claus tail gas treatment system of claim 19, wherein a portion of the second byproduct gas stream is introduced to one of the at least three first stage adsorption vessels during the first stage regeneration cycle.

28. The Claus tail gas treatment system of claim 19, wherein a portion of the second byproduct gas stream is introduced to one of the at least three second stage adsorption vessels during the second stage regeneration cycle.

29. The Claus tail gas treatment system of claim 19, wherein a sales gas is introduced to one of the at least three second stage adsorption vessels during the second stage regeneration cycle.

30. The Claus tail gas treatment system of claim 19, wherein nitrogen gas is introduced to one of the at least three first stage adsorption vessels during the first stage regeneration cycle and to one of the at least three second stage adsorption vessels during the second stage regeneration cycle.

31. The Claus tail gas treatment system of claim 19, wherein vacuum is applied to one of the at least three first stage adsorption vessels during the first stage regeneration cycle and to one of the at least three second stage adsorption vessels during the second stage regeneration cycle.

* * * * *